United States Patent

Kon'i et al.

[11] Patent Number: 5,917,249
[45] Date of Patent: Jun. 29, 1999

[54] APPARATUS FOR DRIVING ELECTRICAL LOADS PROVIDED AT A VEHICLE

[75] Inventors: Mitsuru Kon'i; Hiroyuki Saito, both of Hitachinaka, Japan

[73] Assignee: Hitachi, Ltd., Tokyo, Japan

[21] Appl. No.: 09/002,865

[22] Filed: Jan. 5, 1998

Related U.S. Application Data

[62] Division of application No. 08/708,564, Sep. 5, 1996, Pat. No. 5,808,371.

[30] Foreign Application Priority Data

Sep. 5, 1995 [JP] Japan ..................... 7-228238

[51] Int. Cl.$^6$ ....................................... B60L 1/00
[52] U.S. Cl. ........................................... 307/10.1
[58] Field of Search ................... 307/9.1–10.8, 307/30, 31, 38, 39, 41, 125, 126, 130, 131, 139, 140, 141; 361/18, 86, 87, 90–92; 701/1, 29, 34, 36

[56] References Cited

U.S. PATENT DOCUMENTS

| | | | |
|---|---|---|---|
| 4,575,673 | 3/1986 | Tedeschi et al. | 307/10.1 |
| 4,584,487 | 4/1986 | Hesse et al. | 370/462 |
| 4,639,609 | 1/1987 | Floyd et al. | 307/10.1 |
| 4,697,094 | 9/1987 | Palazzetti | 340/825.05 |
| 4,739,183 | 4/1988 | Tokura et al. | 307/9.1 |
| 4,771,423 | 9/1988 | Ohya et al. | 370/437 |
| 4,894,744 | 1/1990 | Talbot | 307/10.1 |
| 4,914,313 | 4/1990 | Clingon et al. | 307/10.6 |
| 4,942,571 | 7/1990 | Möller et al. | 307/10.1 |
| 4,962,350 | 10/1990 | Fukuda | 361/18 |
| 5,001,398 | 3/1991 | Dunn | 307/10.8 |
| 5,168,272 | 12/1992 | Akashi et al. | 340/825.06 |
| 5,179,494 | 1/1993 | Matsubara | 361/91 |
| 5,289,043 | 2/1994 | Marshall et al. | 307/38 |
| 5,305,316 | 4/1994 | Yoshida et al. | 370/357 |
| 5,343,472 | 8/1994 | Michihira et al. | 370/445 |
| 5,375,120 | 12/1994 | Hirano et al. | 370/358 |
| 5,384,765 | 1/1995 | Sakagami et al. | 370/216 |
| 5,398,240 | 3/1995 | Nakashima et al. | 370/252 |
| 5,408,227 | 4/1995 | Hirabayashi et al. | 340/825.06 |
| 5,408,471 | 4/1995 | Nobutoki et al. | 370/228 |
| 5,436,897 | 7/1995 | Cook | 370/212 |
| 5,450,403 | 9/1995 | Ichii et al. | 370/216 |
| 5,465,010 | 11/1995 | Rimmer | 307/9.1 |
| 5,483,517 | 1/1996 | Kurata et al. | 370/241 |
| 5,504,737 | 4/1996 | Ichii et al. | 307/10.1 |
| 5,513,175 | 4/1996 | Ichii et al. | 370/251 |
| 5,633,537 | 5/1997 | Kurata et al. | 307/10.6 |
| 5,640,055 | 6/1997 | Sugiyama et al. | 370/464 |
| 5,672,917 | 9/1997 | Nakano | 307/140 |
| 5,745,670 | 4/1998 | Linde | 307/65 |

FOREIGN PATENT DOCUMENTS

63-170146  7/1988  Japan.

*Primary Examiner*—Richard T. Elms
*Attorney, Agent, or Firm*—Evenson, McKeown, Edwards & Lenahan, P.L.L.C.

[57] ABSTRACT

An apparatus for driving electrical loads provided at a vehicle by feeding power to the electrical loads, includes a power source for feeding power to a plurality of the electrical loads provided at a vehicle. The plurality of electrical loads are divided into more than one group. Each of the groups is driven by each of a plurality of load drive circuits by feeding power to each of the load drive circuits from the power source, provided at the vicinity of each of set places in the vehicle at which a group of the electrical loads are concentratedly arranged. A power line is connected to the battery, wherein each of the load drive circuits has a pair of power input terminals, and the power line connected to the battery is branched into two branch power wires. Each of the branch power wires is connected to a power input terminal of each of a first two load drive circuits of the load drive circuits. Another input terminal of each of the first two load drive circuits is connected to a power input terminal of a neighboring load drive circuit by a mutual connection power wire, respectively. One of two power input terminals of one of the neighboring two remaining load drive circuits is connected to one input terminal of the other load drive circuit. The branch power wires, the load drive circuits and the mutual connection power wires compose an electrical connection loop.

2 Claims, 15 Drawing Sheets

|  | NORMAL OPERATION | | ABNORMAL OPERATION | | |
|---|---|---|---|---|---|
|  |  |  | ELEMENT ANOMALY | OPEN CIRCUIT OF LOAD | SHORT CIRCUIT OF LOAD |
| LOAD DRIVE SIGNAL | H | L | L  H | L | H |
| LOAD DIAGNOSIS SIGNAL | H | L | — H | H | L |
| DRIVE ELEMENT DIAGNOSIS SIGNAL | H | L | H  L | L | L |

FIG.14

| CODE TO BE SET | INTERVAL INCLUDING ANOMALY OCCURRING PLACE | SWITCHING STATES | |
| --- | --- | --- | --- |
| | | SW-A | SW-B |
| CODE 12 | INTERVAL BETWEEN BCM3 AND LOAD DRIVE CIRCUIT 10 | SWITCHING-OFF BCM3 | SWITCHING-ON BMC3 |
| CODE 22 | | SWITCHING-ON AT LOAD DRIVE CIRCUIT 10 | SWITCHING-OFF AT LOAD DRIVE CIRCUIT 10 |
| CODE 21 | INTERVAL BETWEEN LOAD DRIVE CIRCUIT 10 AND LOAD DRIVE CIRCUIT 12 | SWITCHING-OFF AT LOAD DRIVE CIRCUIT 10 | SWITCHING-ON AT LOAD DRIVE CIRCUIT 10 |
| CODE 32 | | SWITCHING-ON AT LOAD DRIVE CIRCUIT 12 | SWITCHING-OFF AT LOAD DRIVE CIRCUIT 12 |
| CODE 31 | INTERVAL BETWEEN LOAD DRIVE CIRCUIT 12 AND LOAD DRIVE CIRCUIT 14 | SWITCHING-OFF AT LOAD DRIVE CIRCUIT 12 | SWITCHING-ON AT LOAD DRIVE CIRCUIT 12 |
| CODE 42 | | SWITCHING-ON AT LOAD DRIVE CIRCUIT 14 | SWITCHING-OFF AT LOAD DRIVE CIRCUIT 14 |
| CODE 41 | INTERVAL BETWEEN LOAD DRIVE CIRCUIT 14 AND BCM3 | SWITCHING-OFF AT LOAD DRIVE CIRCUIT 14 | SWITCHING-ON AT LOAD DRIVE CIRCUIT 14 |
| CODE 11 | | SWITCHING-ON BCM3 | SWITCHING-OFF BCM3 |

APPARATUS FOR DRIVING ELECTRICAL LOADS PROVIDED AT A VEHICLE

This application is a division of application Ser. No. 08/708,564, filed Sep. 5, 1996, now U.S. Pat. No. 5,808,371.

BACKGROUND OF THE INVENTION

1. Field of the Invention

The present invention relates to an apparatus for driving a plurality of electrical loads by feeding power to each of the electrical loads, particularly an apparatus for driving groups of electrical loads, each of the groups being provided at particular places of a vehicle.

2. Description of Related Art

In existing apparatuses for driving electrical loads provided at a vehicle, plural electrical loads are put on one outlet of a battery and driven. However, such an apparatus needs a number of power wires.

Therefore, a method of driving electrical loads has been devised, in which each load drive circuit is provided at each place in a vehicle, where each group of electrical loads are concentratedly arranged, and each of plural load drive circuits is put on one outlet of a battery.

Further, another method relating to reduction of power wires for feeding power to electrical loads, is disclosed in JP-A-170146/1988.

In any of the above existing apparatuses for driving electrical loads, since plural loads or load drive circuits are put on one outlet of a battery, a number of power wires are necessary. This increases the production cost of a vehicle, as well as the probability of an open or short circuit. That is, a fail safe design for preventing a malfunction of an electrical load due to an open or short circuit of a power wire is not sufficiently provided.

SUMMARY OF THE INVENTION

Objectives of the Invention

The present invention has been devised in considering the above described problems, and is aimed at providing an apparatus for driving electrical loads of a vehicle, by which the production cost is reduced by decreasing the number of power wires connected to load drive circuits for driving the electrical loads, the probability of an open or short circuit in power wires is reduced, and further the electrical loads continue to be driven even if an open or short circuit occurs in the power wires.

Methods Solving the Problem

To attain the objectives, the present invention provides an apparatus for driving electrical loads provided at a vehicle, comprising:

a power source (battery 1 shown in FIG. 1) for feeding power to a plurality of electrical loads provided at a vehicle, said plurality of electrical loads being divided into more than one group, and each of the groups being driven by each of a plurality of load drive circuits (10, 12, 14), by feeding power to each of the load drive circuits from the power source, provided at each of a number of set places in the vehicle, at which a group of electrical loads (40–46) are concentratedly arranged;

a power line connected to the battery;

wherein each of the load drive circuits has a pair of power input terminals (10a, 10b, 12a, 12b, 14a, 14b shown in FIG. 7), and the power line connected to the battery is branched into two branch power wires (101A, 101B), each of the branch power wires being connected to one of two power input terminals (10b or 14a) of each of the first two load drive circuits (10, 14) of the plurality of load drive circuits, another one of two input terminals (10a or 14b) of each of the first two load drive circuits being connected to one of two power input terminals (12b or 12a) of a neighboring load drive circuit (12) by a mutual connection power wire (101C or 101D), respectively, and one of two power input terminals of one of the neighboring two of the remaining load drive circuits exclusive of the first two load circuits, (not shown in the figures), being connected to one of two power input terminals of the other one of the neighboring two by another mutual connection power wire, and the branch power wires, the load drive circuits and the mutual connection power line compose an electrical connection loop.

In the above-mentioned apparatus, each of the load drive circuits includes switching means (switches A and B of a switching circuit 106) for selecting one of the connection states, at one of which a group of electrical loads (44, 45, 46) driven by one (12) of the load drive circuits (10, 12, 14) are connected to one of the power wires via either of two power input terminals (12a, 12b) of the load drive circuit (12), and at another one of which the group of electrical loads driven by the load drive circuit (12) are connected to two of the power wires via both of two power input terminals of the load circuit, and detection means (a shield layer 103, a transmission LSI 107 and a micro-computer 31 shown in FIGS. 3 and 4) for detecting one of an open circuit and a short circuit occurring at one of the branch power wires (101A, 101B) and the mutual connection power wires (101C, 101D), and the apparatus further includes control means (a micro-computer 31) for controlling the switching means, which sends such a command to the switching means that one of two power input terminals of each of two load drive circuits, connected to one power wire of the branch power wires and the mutual connection power wires, at which one of an open circuit and a short circuit occurs, is disconnected from the power wire, if detection means of two of the load drive circuits detect the one of an open circuit and a short circuit at the power wire connected to the two load drive circuits, and sends such a command to the switching means that both of the two power input terminals of one of the load drive circuits continue to be connected to two power wires if the detection means of the load drive circuit does not detect one of an open circuit and a short circuit at two power lines connected to the load drive circuit.

In the above-mentioned apparatus, a predetermined constant potential is applied to conductive shield layers (103) covering one of the branch power wires and the mutual connection power wires, and the detection means comprises potential change determining means provided in each of the load drive circuits, for determining which one of two shield layers (103a or 103b) of two power wires, the shield layers covering each of the two power wires (101A, 101B, 101C or 101D) connected to each of two power input terminals of the load drive circuit, has a lower potential than the other shield layer, and for sending a result of the determination to the control means.

The above-mentioned apparatus has alarming means for generating an alarm that an anomaly occurs at the power wires, if one of an open circuit and a short circuit is detected by the detection means.

The above-mentioned apparatus, further comprises transmission wires connecting the load drive circuits and the control means which controls the load drive circuits, wherein each of the load drive circuits has a pair of signal input terminals (10*a*, 10*b*, 12*a*, 12*b*, 14*a*, 14*b* shown in FIG. 7), and one of the transmission wires is branched at the control means in to two branch transmission wires (102A, 102B), each of the branch transmission wires being connected to one of two signal input terminals (10*b* or 14*a*) of each of a first two load drive circuits (10, 14) of the plurality of load drive circuits, another one of two signal input terminals (10*a* or 14*b*) of each of the first two load drive circuits being connected to one of two signal input terminals (12*b* or 12*a*) of a neighboring load drive circuit (12) by a mutual connection transmission wire (102C or 102D), respectively, and one of two signal input terminals of one of a neighboring two remaining drive circuits exclusive of the first two load circuits, (not shown in figures), being connected to one of two signal input terminals of the other one of the neighboring two by another mutual connection transmission wire, and the branch transmission wires, the load drive circuits and the mutual connection transmission wires compose an electrical connection loop.

In the above-mentioned apparatus, a pair of a branch power wire and a branch transmission wire are united into a cable by covering the two wires with an outer sheath, and a pair of a mutual connection power wire and a mutual connection transmission wire are also united into a cable by covering the two wires with an outer sheath.

Further, in the above-mentioned apparatus,each of the load drive circuits, to which a group of electrical loads are connected, includes a group of load drive elements (110, 111, 112 shown in FIG. 5), each of the load drive elements feeding power to an electrical load when the load drive element receives a control signal for driving the electrical load, power supply interrupting means (a switch C of the switching circuit 106) for interrupting power fed to a load drive element from two power input terminals of the load drive circuit, and terminal side control means (a transmission LSI 107 shown in FIG. 4) for sending a load drive signal to each of the load drive elements, and a power supply interruption signal to the power supply interrupting means, and the control means (31) determines whether each of the electrical loads connected to each of the load drive circuits is to be driven, and sends a load drive command signal to drive an electrical load to terminal side control means in a corresponding load drive circuit connected to the electrical load if it is determined that the electrical load is to be driven, and sends a power supply interruption command signal to stop an electrical load to the terminal side control means in a corresponding load drive circuit connected to the electrical load if it is determined that the electrical load is to be stopped.

Further, in the above-mentioned apparatus, each of the load drive circuits, to which a group of electrical loads are connected, includes a group of load drive elements, each of the group of load drive elements feeding power to an electrical load when the load drive element receives a control signal for driving the electrical load, power supply interrupting means for interrupting power fed to a load drive element from two power input terminals of the load drive circuit, terminal side control means for sending a load drive signal to each of the load drive elements and a power supply interruption signal to the power supply interrupting means, and load drive element diagnosing means (a diagnosis circuit 110*b*, a transmission LSI 107, shown in FIG. 5) for detecting an anomaly occurring in the group of load drive elements, and the control means sends a power supply interruption command signal to stop driving a load drive element to a terminal side control means in a corresponding load drive circuit containing the load drive element if an anomaly occurrence in the load drive element of the load drive circuit is detected by the load drive element diagnosing means in the terminal side control, and if any anomaly occurrence in a load drive element of a load drive circuits is not detected by the load drive element diagnosing means of the terminal side control means in the load drive circuit, the control means determines whether the electrical load connected to the terminal control means is to be driven, and sends a load drive command signal to drive the electrical load to a corresponding terminal side control means connected to the electrical load if it is determined that the electrical load is to be driven.

Further, in the above-mentioned apparatus, each of the load drive circuits, to which a group of electrical loads are connected, includes a group of load drive elements, each of the group of load drive elements feeding power to an electrical load when the load drive element receives a control signal for driving the electrical load, terminal side control means for sending a load drive signal to each of the load drive elements and a power supply interruption signal to the power supply interrupting means, and load diagnosing means (a diagnosis circuit 110*b*, a transmission LSI 107, shown in FIG. 5) for detecting an electrical anomaly occurring between a load drive element and an electrical load connected to the load drive element, and the control means sends a command signal to stop driving an electrical load to terminal side control means in a corresponding load drive circuit connected to the electrical load if an electrical anomaly occurrence between a load drive element connected to the electrical load and to the load drive element is detected by the load diagnosing means in the terminal side control means, and if any anomaly occurrence between a load drive element and an electrical load connected to the load drive element is not detected by the load diagnosing means in the terminal side control means, the control means determines whether the electrical load is to be driven, and sends a load drive command to drive the electrical load to a corresponding terminal side control means connected to the electrical load if it is determined that the electrical load is to be driven.

To reduce power consumed in an apparatus for driving electrical loads by feeding power to the electrical loads, the present invention provides an apparatus for driving electrical loads of a vehicle, comprising:

a power source for generating power fed to the electrical loads;

load drive units, each of the load drive units feeding power to each of the electrical loads from the power source if a driving command signal for the electrical load is input to the load drive unit;

power wires for electrically connecting the power source and the load drive units;

power supply interrupting means provided at each of the power wires, for interrupting power fed to a load drive unit if a power supply interruption command signal to the load drive unit is input to the power supply interruption means; and control means for determining whether an electrical load connected to each of the load drive units is to be driven, and sends a load drive command signal to drive an electrical load to a corresponding load drive unit connected to the electrical load if it is determined that the electrical load is to be driven, and a power supply interruption command signal to stop driving an electrical load to the power supply interruption means in a corresponding load drive unit connected to the electrical load if it is determined that the electrical load is to be stopped.

Further, to reduce the production cost by decreasing the number of power wires connected to load drive circuits and the probability of an open or short circuit in the power wires, and to continue the driving of the electrical loads even if an open or short circuit occurs in the power wires, the present invention provides an apparatus for driving electrical loads of a vehicle, comprising:

a power source for feeding power to a plurality of electrical loads provided at a vehicle, said plurality of electrical loads being divided into more than one group, and each of the groups being driven by each of a number of load drive circuits, by receiving power from the power source, provided at each of a number of set places in the vehicle, at which a group of electrical loads are concentratedly arranged;

power wires for connecting the power source and each of a first two of the load drive circuits of the plurality of load drive circuits, and a neighboring two of the load drive circuits, and for feeding power to each of the load drive circuits from the power source;

control means connected to the first two load drive circuits, for controlling each of the load drive circuits;

transmission wires for electrically connecting the control means and each of the first two of the load drive circuits, and the neighboring two of the load drive circuits, and for transmitting signals between each of the load drive circuits and the control means;

two power input terminals and two signal input terminals being provided at each of the load drive circuits;

switching means for selecting one of connection states, at one of which a group of electrical loads driven by one of the load drive circuits are connected to one of the power wires via either of two power input terminals of the load drive circuit, and at another of which a group of electrical loads driven by one of the load drive circuits are connected to two of the power wires via both of two power input terminals of the load drive circuit, and detection means for detecting one of an open circuit and a short circuit at the power wires connected to the load drive circuits;

wherein a power line connected to the battery is branched into two branch power wires of the power wires, each of the branch power wires being connected to one of two power input terminals of each of the first two load drive circuits of the load circuits, another one of two input terminals of each of the first two load drive circuits being connected to one of two power input terminals of a neighboring load drive circuit by a mutual connection power wire of the power lines, respectively, and one of power input terminals of one of a neighboring two of the remaining drive circuits exclusive of the first two load circuits, being connected to one of two power input terminals of the other one of the neighboring two by another mutual connection power wire of the power wires, the branch power wires, the load drive circuits and the mutual connection power wires compose an electrical connection loop, a transmission line is branched at the control means into two branch transmission wires of the transmission wires, each of the branch transmission wires being connected to one of two signal input terminals of each of the first two load drive circuits of the load drive circuits, another one of two signal input terminals of each of the first two load drive circuits being connected to one of two signal input terminals of a neighboring load drive circuit by a mutual connection transmission wire of the transmission wires, respectively, and one of two signal input terminals of one of the neighboring two of the remaining load drive circuits exclusive of the first two load circuits, being connected to one of two signal input terminals of the other one of the neighboring two by another mutual connection transmission wire of the transmission wires, the branch transmission wires, the load drive circuits and the mutual connection transmission wires compose an electrical connection loop, and the control means sends such a command signal to the switching means that one of two power input terminals of a load drive circuit, connected to one power wire of the branch power wires and the mutual connection power wires, at which one of an open circuit and a short circuit occurs, is disconnected from the one power wire if detection means of two load drive circuits detect the one of an open circuit and a short circuit at the one power wire, and sends such a command signal to the switching means that both of two power input terminals of each of the load drive circuits continues to be connected to two of the power wires if the detection means does not detect one of an open circuit and a short circuit at the two power wires connected to the load drive circuit.

In the present invention, since the branch power wires, the load drive circuits and the mutual connection power wires are connected in an electrical loop, the total amount of power wires used for the load driving apparatus of a vehicle is much less in comparison with the amount of power wires used for an existing drive apparatus in which all power lines connected to the electrical equipment are put to one outlet of a power source, which reduces the production cost of a load driving apparatus and the probability of an open circuit or a short circuit from occurring at the power wires.

Further, in the present invention, since two power input terminals are provided at each of the load drive circuits, and the two power input terminals receive power from the power source, respectively, that is, a duplex power distribution system is realized, then even if an open circuit or a short circuit occurs at one of the two power wires connected to the two power input terminals of a load drive circuit, it is still possible to continue supplying power to the load drive circuit via a power input terminal connected to a remaining normal power wire, which improves the reliability of a load driving apparatus of a vehicle.

Further, in the load driving apparatus of the present invention, at which switching means and detection means are provided, an open circuit or a short circuit occurring at the branch power wires and the mutual connection power wires is detected by the detection means. If an open circuit or a short circuit is detected, a group of electrical loads of a load drive circuit of which one of two power input terminals is connected to a failed power wire, are disconnected from the failed power wire by disconnecting the failed power wire from a power input terminal connected to the failed power wire by operating the switching means. Since the disconnecting operation is carried out in each of the load drive circuits, the failed power wire is removed from a power distribution system of the load drive apparatus. When a short circuit occurs at a power wire, a fire probably occurs at the place of the short circuit, besides much consumption of power. Thus, the load drive apparatus of the present invention can avoid the useless power consumption and the fire occurrence due to the short circuit, by disconnecting the failed power wire from the power distribution system of a vehicle.

BRIEF DESCRIPTION OF THE DRAWINGS

FIG. 14 is a decision table for determining an anomalous place at which an anomaly occurs, and switch operations to be taken to the failed power wire including the anomalous place, preset corresponding to each set of anomaly detection codes, in the embodiment according to the invention.

DETAILED DESCRIPTION OF THE EMBODIMENTS

Figure 1:
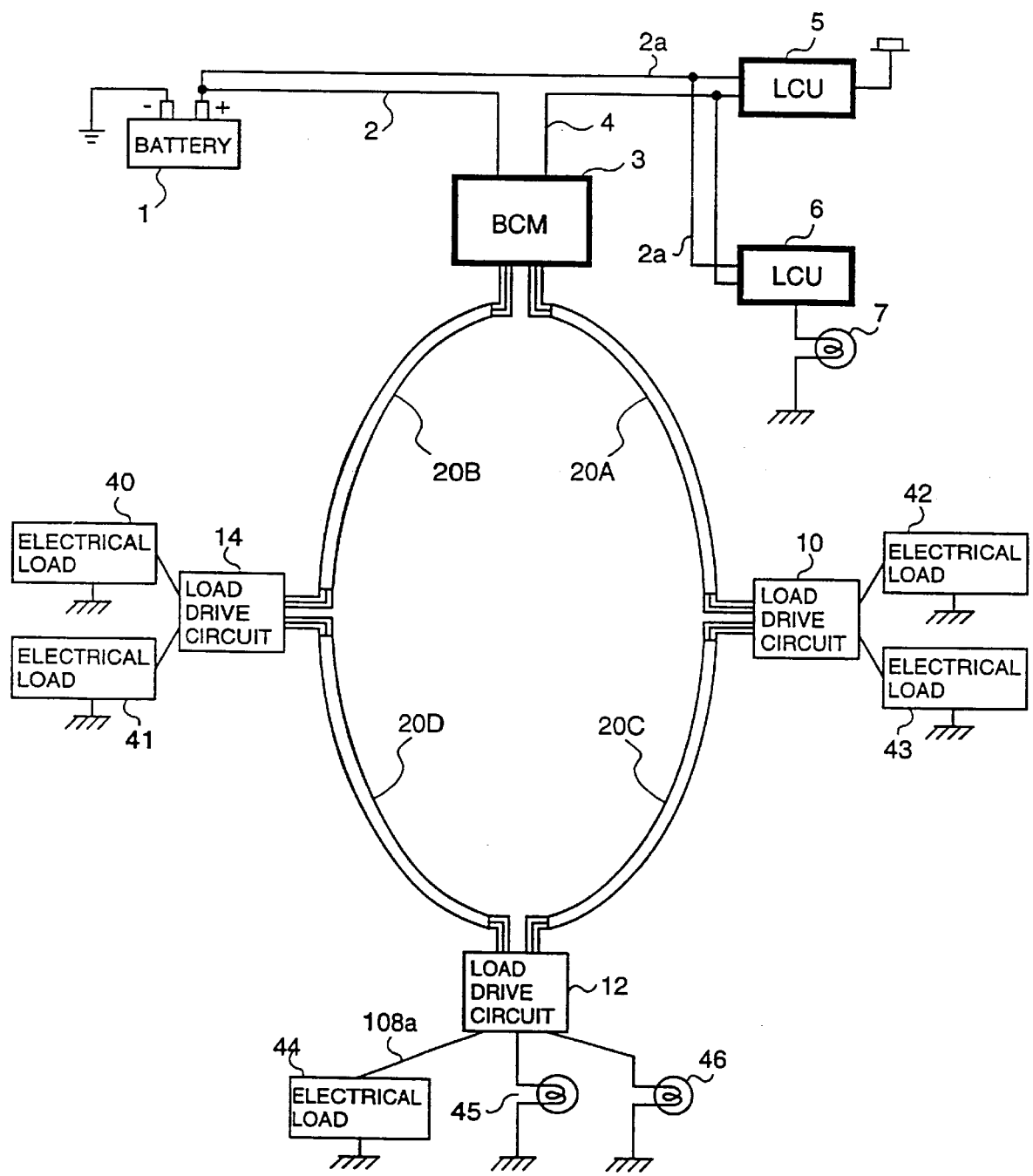
FIG. 1 is a diagram showing a system composition of an embodiment of an apparatus for driving electrical loads provided at a vehicle of the present invention.

Hereinafter, details of the present invention will be explained with reference to embodiments shown in the drawings.

An apparatus for driving electrical loads provided at a vehicle (simply referred to as a load driving apparatus), as shown in FIG. 1, comprises a battery 1, a BCM (Body Control Module) 3, an information input/output group composed of LCUs (Local Control Units) 5 and 6 connected to each other with multiplex transmission wires 4, a load control group composed of load drive circuits 10, 12 and 14 for driving and controlling electrical loads arranged at various places in a vehicle, such as a lamp, etc., which are connected to each other with a power and multiplex transmission cable 20. The two groups are controlled by the BCM 3. The BCM 3 controls electrical equipment (loads) provided at a vehicle, and each of the LCUs 5 and 6 is an information input/output terminal for taking in states of a switch operated by a driver, such as a lamp switch, a power window switch, etc., for displaying operational states of the load drive circuits, and for generating an alarm, and so forth.

An alarm lamp 7 connected to the LCU 6 is turned on when an anomaly occurs in the load control group, and informs the driver that an anomaly is occurring in an electrical system of the vehicle. Although only one alarm lamp (the alarm lamp 7) is shown in FIG. 1, an alarm lamp can be used for every anomaly such as a short circuit at the power and multiplex transmission cable 20, an anomaly occurrence at a load drive circuit, etc.. Further, it is also contemplated to use alarm informing means for the driver, besides an alarm lamp, such as a voice announcing alarm, a character displaying alarm to which a liquid-crystal display plate is used, and so on.

The battery 1 is connected to the BCM 3 through a main power line 2, and further to the LCUs 5 and 6 via a power line 2a. The load drive circuits 10, 12 and 14 are connected to each other in a loop form with the power and multiplex transmission cables 20. The reason why the load drive circuits are connected in a loop form is that each of the load drive circuits can operate even if, for example, an open circuit (interruption) occurs between the load drive circuits 10 and 12.

Each the load drive circuits 10, 12 and 14 is arranged in the vicinity of particular places at which a group of electrical loads are concentratedly arranged, and drives the electrical equipment such as lamps, motors, control devices for operating electrical loads, etc., by feeding power to them. Numerals 40 46 shown in FIG. 1 indicate electrical loads such as a lamp and so forth, connected to the load drive circuits.

In the following, an outline of the operations of the embodiment of the load drive apparatus is explained.

For example, when a switch 8 for a pair of head lights 45 of a vehicle is turned on, the LCU 5 connected to the switch 8 sends data "the switch 8 for the head lights 45 is turned on" to the BCM 3. The BCM 3 determines to which of the load drive circuits the data is to be sent, and sends a command signal "to turn on the head lights 45" to the load drive circuit 12 connected to the head lights 45. The load drive circuit 12 which has received the command signal, turns on the head lights 45 by connecting a power path to the head lights 45 in order to allow current to flow to the head lights 45.

Each of components composing the load drive apparatus of the embodiment is explained in detail as follows.

Figures 2, 6:
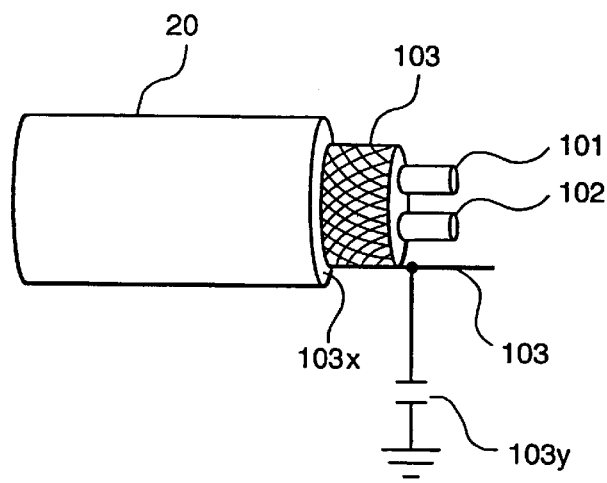
FIG. 2 is a perspective view of a main part of a power and multiplex transmission cable in the embodiment according to the invention.
FIG. 6 is a decision table used for determining whether a power distribution system is anomalous, in the embodiment according to the invention.

Each of the power and multiplex transmission cables 20 connecting two neighboring load circuits, as shown in FIG. 2, is composed of a power wire 101 in which current flows from the battery 1, a transmission wire 102 in which various kinds of signals are transmitted, a shield layer 103 covering the power wire 101 and the transmission wire 102, and an outer sheath 103x covering the shield layer 103. That is, each of the power and multiplex transmission cables 20 is a two conductor shielded cable. However, the cable 20 (hereafter numeral 20 is used for both of a single and plural cables) of the embodiment of the invention is different from the usual shielded cable in that a constant potential is applied to the shield layer 103 of the cable 20. By applying a constant potential to the shield layer 103, it is possible to detect a presage of an open circuit or a short circuit of the cable 20 by monitoring the potential of the shield layer 103 since the potential of the shield layer 103 first falls to the level of the ground (chassis ground) when the cable 20 is rubbed by a member of a vehicle body or gets jammed in members of a vehicle body. The shield layer 103 is connected to the ground via a capacitor 103y. Since the shield layer 103 is connected to the ground via the capacitor 103y which easily flows an electric waveform with a high frequency, even if an electric wave with a high frequency is applied to the cable 20 from the outside, the electric wave flows to the ground via the capacitor 103y, which can prevent undesired effects such as electrical noises or radiation noises. Further, since the shield layer 103 is made of metal, the mechanical strength of the cable 20 is increased, which decreases the probability of an interruption of the cable 20.

Figure 3:
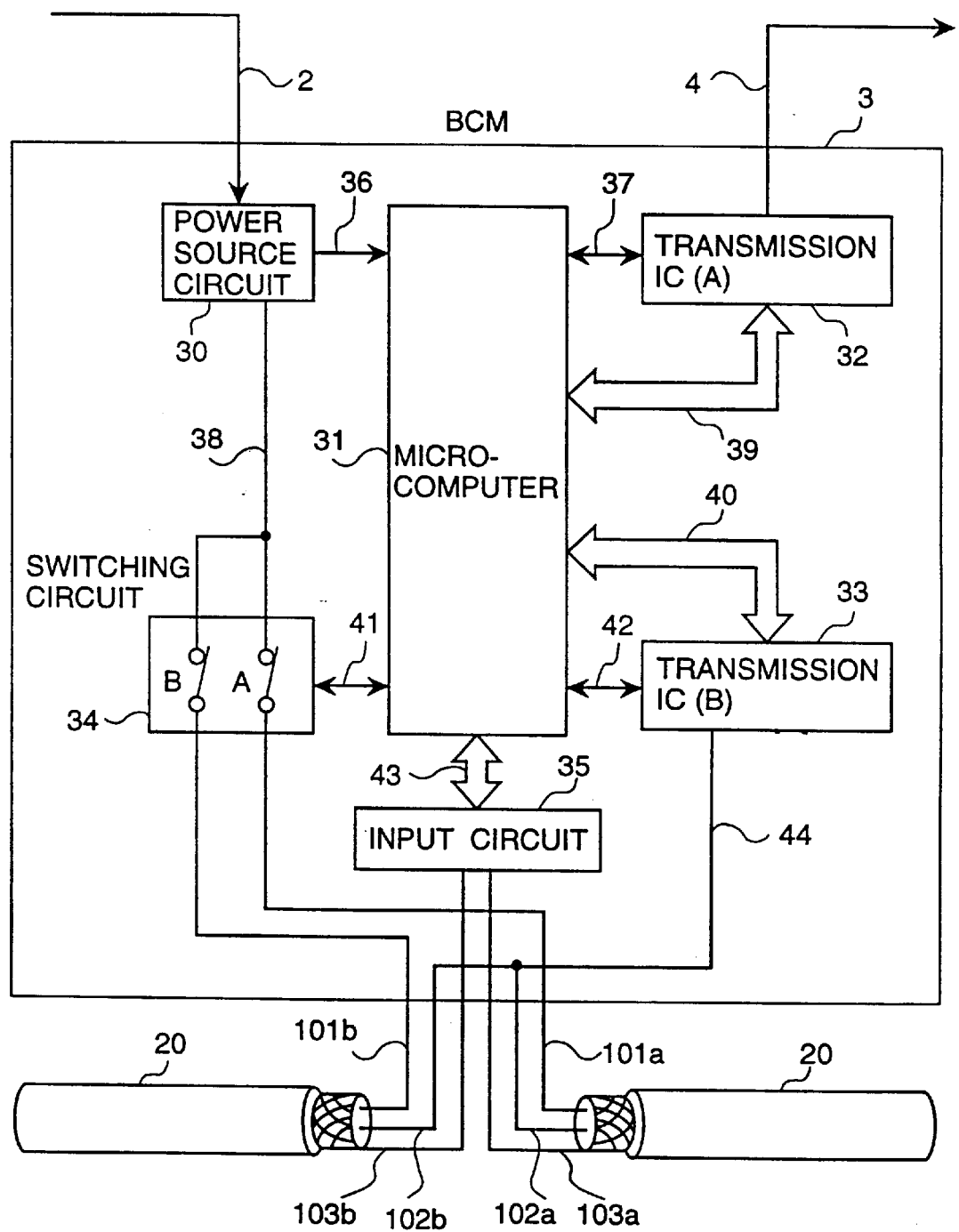
FIG. 3 is a circuit block diagram of a BCM in the embodiment according to the invention.

The BCM 3, as shown in FIG. 3, is composed of a micro-computer 31 (host control means) used for various kinds of data processing, a transmission IC (A) 32 for transmitting data with the LCUs 5 and 6, a transmission IC (B) 33 for transmitting data with the load drive circuits 10, 12 and 14, a switching circuit 34, an input circuit 35 for receiving the potential value at the shield layer 103 of the power and multiplex transmission cable 20, and an internal power source circuit 30 for feeding power to the above-mentioned devices.

The main power line 2 connected to the battery 1 is fed to the internal power source circuit 30 which branches the main power line 2 into a power wire 36 for feeding power to internal circuits of the BCM 3 such as the micro-computer 31 and so on, 5 and a power wire 38 connected to the power and multiplex transmission cable 20. The power wire 38 is led to the switching circuit 34, and further branched into two power wires which are connected to power wires 101a and 101b of the power and multiplex transmission cable 20, via switches A and B, respectively. The switching circuit 34 is connected to the micro-computer 31 with a control signal transmission wire 41. Each of the switches A and B is controlled by an ON/OFF control signal sent from the micro-computer 31 via the control signal transmission wire 41.

The transmission IC (A) 32 is connected to the LCUs 5 and 6 with a multiplex transmission wire 4, and the transmission IC (B) 33 is connected to each of the load drive circuits 10, 12 and 14 via a multiplex transmission wire 44 connected to the power and multiplex transmission cable 20. The transmission ICs 32 and 33 are connected to the micro-computer 31 with control signal transmission lines 37 and 42, and data buses 39 and 40, respectively. The multiplex transmission wire 44 connected to the transmission IC (B) 33 is branched into two wires which are connected to multiplex transmission wires 102a and 102b of the power and multiplex transmission cable 20, respectively.

The input circuit 35 is connected to the micro-computer 31 via a bus 43. The potential at each of the shield layers 103a and 103b of the power and multiplex transmission cable 20 is taken into the micro-computer 31 via the bus 43 connected to the input circuit 35, and monitored by the micro-computer 31.

The suffixes (a) and (b) of the power wires 101a and 101b, the multiplex transmission wires 102a and 102b, and the shield layers 103a and 103b, of the power and multiplex transmission cable 20, are marked for indicating at which side each wire is positioned, i.e., the left side or the right side of the BCM 3. In the description of the embodiment, the suffix (a) means that a wire marked with the suffix (a) extends in the clockwise direction from the BCM 3, and a wire marked with the suffix (b) extends in the counter-clockwise direction from the BCM 3. The suffixes (a) and (b) are marked to the two wires connected to each of the load drive circuits 10, 12 and 14, in the same manner as mentioned above, that is, the suffix (a) means that a wire marked with the suffix (a) in the power and multiplex transmission cable 20 extends in the clockwise direction from each of the load drive circuits 10, 12 and 14, and a wire marked with the suffix (b) in the power and multiplex transmission cable extends in the counter-clockwise direction from each of the load drive circuits 10, 12 and 14.

Figure 4:
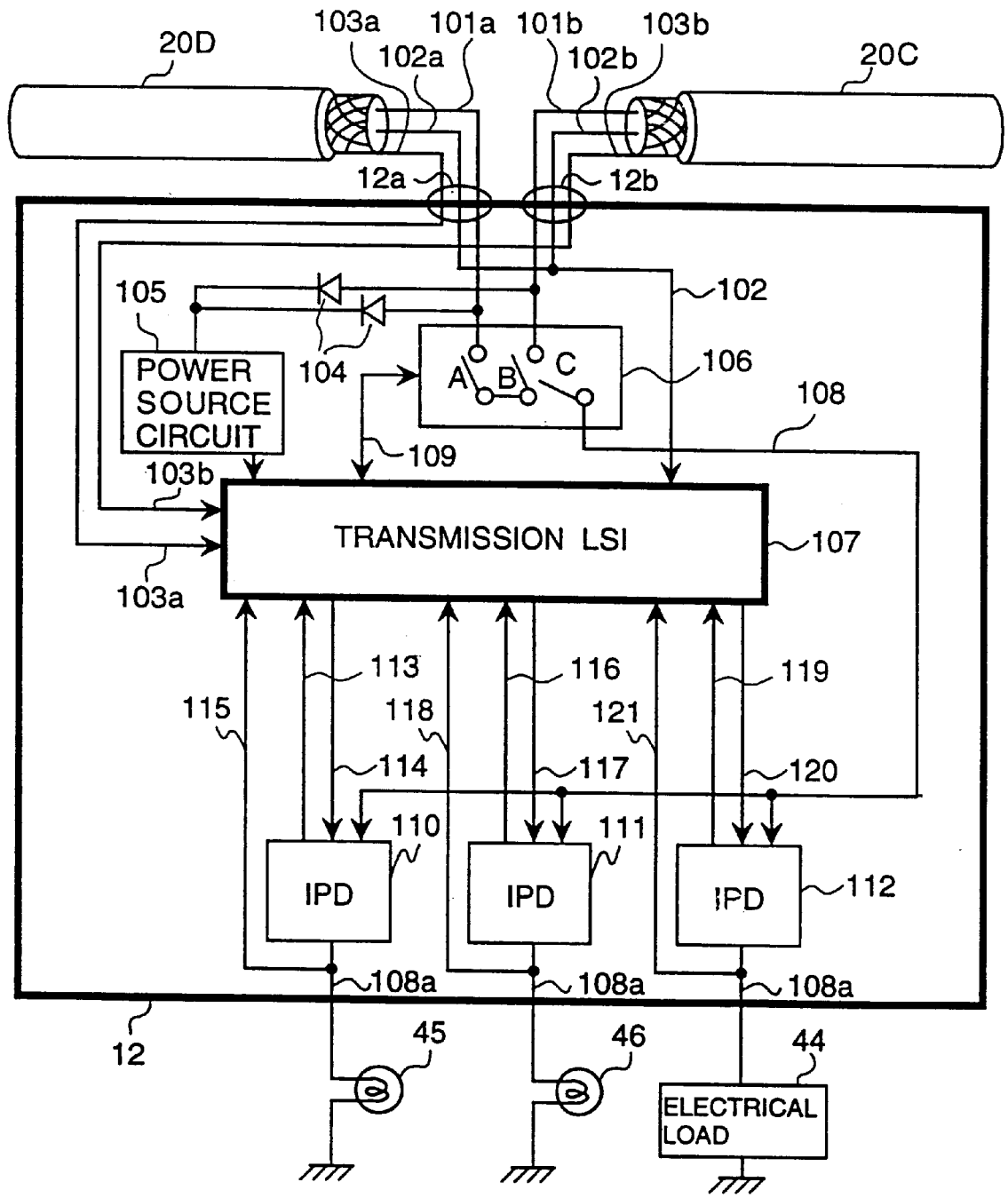
FIG. 4 is a circuit block diagram of a load drive circuit in the embodiment according to the invention.

The load drive circuit 12, as shown in FIG. 4, is composed of two signal input terminals, each of the two signal input terminals being connected to each of the two power and multiplex transmission cables 20, a transmission LSI 107 for controlling transmission with the BCM 3 and internal circuits in the load drive circuits 12, a switching circuit 106 for receiving power from at least one of two power wires 101a and 101b, or for interrupting the power supply from both of the two wires 101a and 101b, IPDs (Intelligent Power Devices) 110, 111, and 112 for directly driving the electrical loads 44, 45 and 46, connected to the load drive circuit 12, respectively, and an internal power source circuit 105 for feeding power to the above-mentioned internal circuits or devices.

The switching circuit 106 is composed of switches A, B and C, the switch A connecting the power wire 101a to, or disconnecting the power wire 101a from, the IPDs 110, 111 and 112, the switch B connecting the power wire 101a to, or disconnecting the power wire 101b from, the IPDs 110, 111 and 112, and the switch C connecting both of the power wires 101a and 101b to, or disconnecting both of the power wires 101a and 101b from, the IPDs 110, 111 and 112. The power wire 101a is connected to an input terminal of the switch A via the input terminal 12a . Further, The power wire 102b is connected to an input terminal of the switch B via the input terminal 12b. Output terminals of the switches A and B are connected to an input terminal of the switch C. An output terminal of the switch C is connected to the IPDs 110, 111, and 112 with a power wire 108. The switching circuit 106 is connected to the transmission LSI 107 with a control signal wire 109, of which the switches A, B and C are controlled by on/off-switching control signals sent from the transmission LSI 107 via the control signal wire 109, respectively.

In the following, operations of the switching circuit 106 are explained more in detail. Usually, all the switches A, B and C are at the ON state. If an open circuit or a short circuit, or a presage of an open circuit or a short circuit, is detected, a switch A or B is turned off. For example, If an open circuit or a short circuit, or a presage of an open circuit or a short circuit, is detected at the power and multiplex transmission cable extending in the left direction of a load drive circuit, that is, the power wire 101a, only the switch A is turned off. In this condition, power is fed from only the power wire 101b extending in the right direction of the load drive circuit. Detection of an open circuit or a short circuit, and operational procedures of the switch A or B after the detection of an open circuit or a short circuit, will be explained later.

The switching circuit 106 is used for the following two objectives.

The first objective is to reduce the current consumption for a not-driven IPD. The word "a not-driven IPD" means that a drive element (will be explained later) contained in the IPD is not in the ON state. Although generally an IPD has excellent performance, since the power consumption of a not-driven IPD is larger than the consumption of a usual drive element, the risk of battery exhaustion is presumed if there are many not-driven IPDs. Therefore, in order to prevent battery exhaustion, the power consumption is saved by turning off the switch C for interrupting power supply to the IPDs, if the IPDs are not to be driven. Determining whether an IPD is driven or not, and operational procedures of the switch C after determining whether the IPD is driven or not, will be explained later.

The second objective is to take a countermeasure to a failure of an IPD. For example, when a failure occurs in an IPD, there is a case in which the IPD feeds power to an electrical load even though the transmission LSI does not output a control signal to drive the electrical load driven by the IPD. Therefore, power supply to an electrical load connected to a failed IPD is interrupted to reduce the power consumption. Detecting whether an IPD has failed or not, and operational procedures of the switch C after determining the IPD is not to be operated, will also be explained later.

Each of the power wires 101a and 101b in the power and multiplex transmission cable 20 is branched into two wires in a load drive circuit, one of the branched two wires being connected to the switching circuit 106 and another of the branched two wires being connected to the internal power source circuit 105. Diodes 104 are provided in the branched wires of the power wires 101a and 101b, connected to the internal power source circuit 105, respectively. The diodes 104 are provided to prevent current from inversely flowing in the power wires 101a and 101b, respectively, and to operate as an OR function circuit of current flowing in the power wires 101a and 101b to the internal power source circuit 105, that is, if either of the power wires 101a and 101b is alive, the diodes 104a and 104b flows current to the internal power source circuit 105 from the alive power wire. The internal power source circuit 105 is connected to the other internal circuits or devices with power wires. The internal power source circuit 105 is used as a constant voltage power supply circuit for feeding power to the transmission LSI 107, and the other internal circuits or devices.

Figure 5:
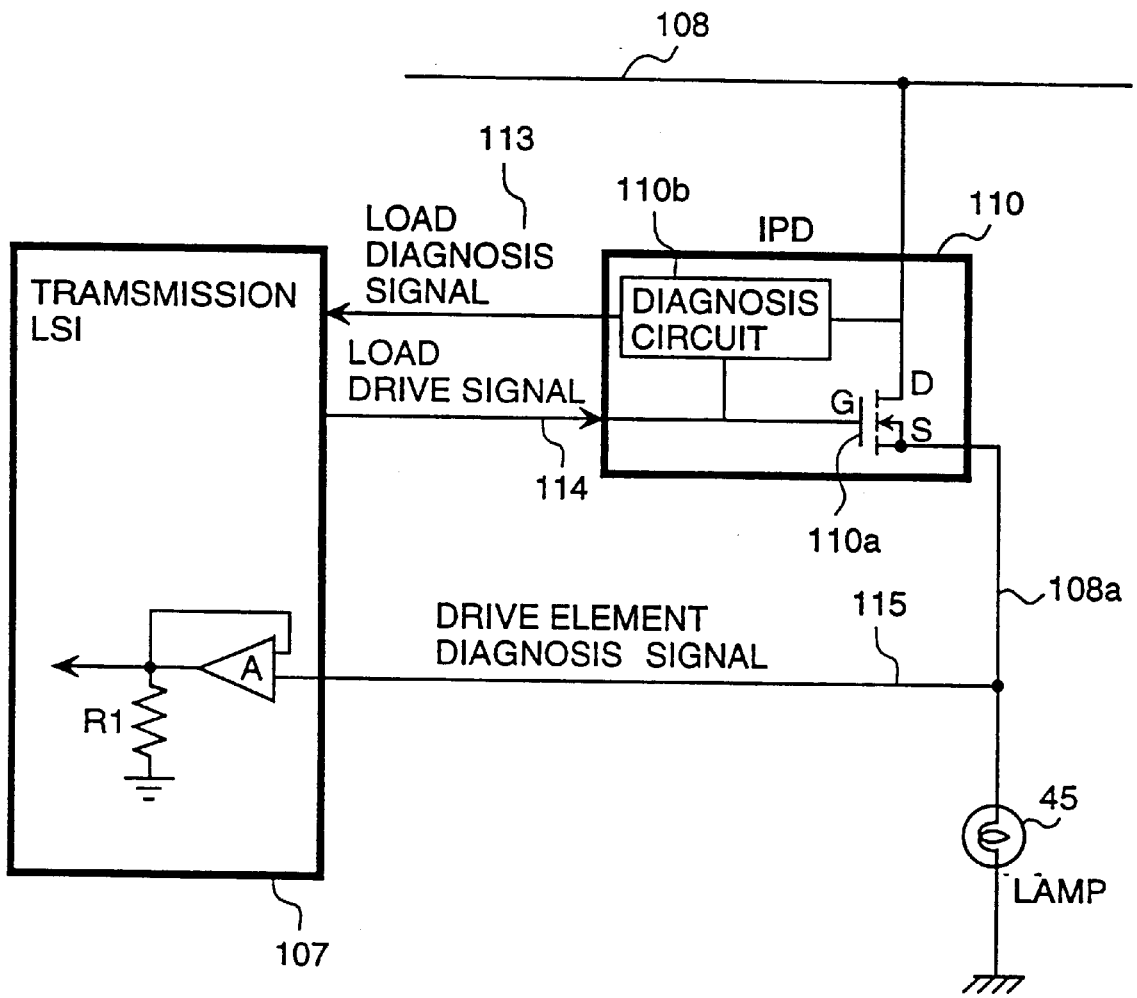
FIG. 5 is a block diagram showing circuits of a transmission LSI and an IPD in the embodiment according to the invention.

The transmission wires 102a and 102b, and the shield layers 103a and 103b in the power and multiplex transmission cable 20, are connected to the transmission LSI 107. The respective potential of the shield layers 103a and 103b in the power and multiplex transmission cable 20, is monitored by the transmission LSI 107. An IPD (Intelligent Power Device) which has been recently extensively used, is a kind of load drive element which also diagnoses an open circuit or a short circuit occurring at a load connected to the IPD, and also functions to send results of the diagnosis to the transmission LSI 107 and to protect itself. The IPD 110, as shown in FIG. 5, is composed of a load drive element 110a for controlling supply and interruption of power fed to the electrical load 45, and a diagnosis circuit 110b for diagnosing an open circuit or a short circuit in the electrical load 45 connected to the load drive element 110a. A gate, a drain and a source of the load drive element 110a are connected to the transmission LSI 107 with a drive signal wire 114, the power wire 108 and a power wire 108a, respectively. The diagnosis circuit 110b is connected to the transmission LSI 107 with a load diagnosis signal wire 113. The diagnosis circuit 110b takes in the drain potential and a gate potential of a load drive element 110a, and diagnoses an open circuit or a short circuit in the electrical load 45 by monitoring the drain potential and the gate potential. Further, the diagnosis circuit 110b sends the results of the diagnosis as a load diagnosis signal to the transmission LSI 107 via the load diagnosis signal wire 113. The power wire 108a is connected to the transmission LSI 107 with a load drive element diagnosis signal line 115. In the transmission LSI 107, an impedance converter A connected to the load drive element diagnosis signal wire 115 and a resistor R1 connected to the converter A and the ground, are provided. The converter A and the resistor R1 are prepared to prevent disturbances to the transmission LSI 107 from the outside, and to stabilize the load drive diagnosis signal on occurrence of an interruption of the power wire 108a.

The composition of the IPD 110, as one of the IPDs, was explained above. The respective composition of the other IPDs 111 and 112 is the same as the composition of the IPD 110. That is, each of the IPDs 111 and 112 has also a load drive element and a diagnosis circuit, and is connected to the transmission LSI 107 with a drive signal wire 117 or 120, and a load diagnosis signal wire 116 or 119, as shown in FIG. 4. Each of the power wires 108a connecting each of the IPDs 111 and 112, and each of the electrical loads 46 and 47, respectively, is connected to the transmission LSI 107 with each of the load drive element diagnosis signal wires 118 and 121. Although the composition of only the load drive circuit 12 was explained above, the respective composition of the other load drive circuits 10 and 14 is the same as i the composition of the load drive circuit 12.

The method of diagnosing an open circuit and a short circuit of an electrical load connected to a load drive circuit, and an anomaly in an IPD, is explained in the following with reference to FIG. 6. A dash mark [–] in the figure, indicates anyone of "H" and "L".

If any anomaly does not occur in an IPD and an electrical load connected to the IPD, when the transmission LSI 107 sends a load drive signal of "H" (a load switching-on command) to the IPD, a diagnosis circuit of the IPD also outputs a load diagnosis signal of "H" to the transmission LSI 107. Further, when the transmission LSI 107 sends a load drive signal of "L" (a load switching-off command) to the IPD, the diagnosis circuit of the IPD also outputs a load diagnosis signal of "L" to the transmission LSI 107. Thus, the transmission LSI 107 determines that an anomaly does not occur in the electrical load connected to the IPD, if both the load drive signal and the load diagnosis signal simultaneously indicate "H" or "L".

If an open circuit occurs in an electrical load connected to an IPD, when a transmission LSI 107 sends a load drive signal of "L" to the IPD, a diagnosis circuit of the IPD outputs a load diagnosis signal of "H" to the transmission LSI 107. Further, if a short circuit occurs in an electrical load connected to a IPD, when a transmission LSI 107 sends a load drive signal of "H" to the IPD, a diagnosis circuit of the IPD outputs a load diagnosis signal of "L" to the transmission LSI 107. As mentioned above, if it is determined that an IPD is normal, a transmission LSI 107 connected to the IPD determines that an open circuit occurs in an electrical load connected to the IPD, when a load drive signal sent from the transmission LSI 107 and a load diagnosis signal sent from the IPD are "L" and "H", respectively, and that a short circuit occurs in the electrical load connected to the IPD, when a load drive signal sent from the transmission LSI 107 and a load diagnosis signal sent from the IPD are "H" and "L", respectively.

If an IPD itself fails, since a correct load diagnosis signal is not available, a transmission LSI 107 totally determines a cause of an occurring anomaly, based on three signals of: a load drive signal, a load diagnosis signal and a load drive element diagnosis signal. That is, if the load drive signal, the load diagnosis signal and the load drive element diagnosis signal all simultaneously indicate "H" or "L", it is determined that the IPD and the electrical load connected to the IPD is normal. If the load drive signal indicates "L", the load diagnosis signal indicates "H" or "L", and the load drive element diagnosis signal indicates "H", or if the load drive signal indicates "H", the load diagnosis signal indicates "H", and the load drive element diagnosis signal indicates "L", it is determined that the load drive element is anomalous. Further, if the load drive signal indicates "L", the load diagnosis signal indicates "H", and the load drive element diagnosis signal indicates "L", it is determined that an open circuit occurs at the electrical load, and if the load drive signal indicates "H", is the load diagnosis signal indicates "L", and the load drive element diagnosis signal indicates "L", it is determined that a short circuit occurs at the electrical load.

Figure 7:
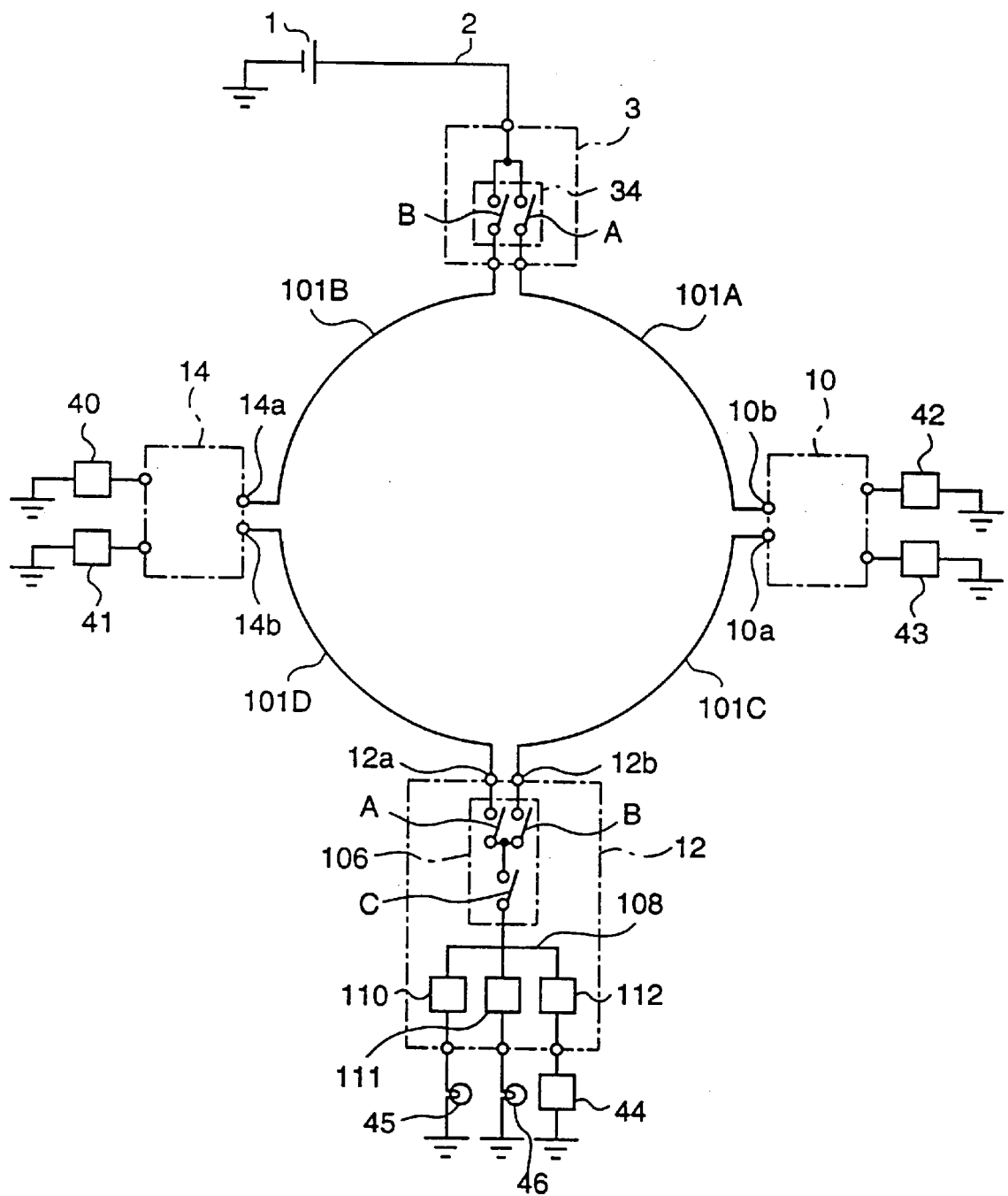
FIG. 7 is a schematic circuit illustration of the power distribution system in the embodiment according to the invention.

In the following, the arrangement of the power wires for feeding power to each of the electrical loads 41–46 from the battery 1, is explained by referring to FIG. 7.

Each of the load drive circuits 10, 12 and 14 is provided at each place in a vehicle body, at the vicinity of which a group of electrical loads is concentratedly arranged. A pair of power input terminals 10*a* and 10*b*, 12*a* and 12*b*, or 14*a* and 14*b* are provided at each of the load drive circuits 10, 12 and 14. A main power source line 2 connected to the battery 1, extends to the BCM 3, and is branched into two power wires in the BCM 3. Further, the branched two power wires are connected to the power input terminals 10*b* and 14*a* of the load drive circuits 10 and 14 via the switches A and B, respectively (FIG. 3). The branched two power wires from the branch place to the power input terminals 10*b* and 14*a* of the load drive circuits 10 and 14, are named as branch power wires 101A and 101B, respectively. The power input terminal 10*a* of the load drive circuit 10 and the power input terminal 12*b* of the load drive circuit 12, are connected to each other with a mutual connection power wire 10C, and the power input terminal 12*a* of the load drive circuit 12 and the power input terminal 14*b* of the load drive circuit 14, are connected to each other with a mutual connection power wire 101D. That is, in the power distribution system of the embodiment, main components are sequentially connected in the order of the branch point of the main power source line 2, the branch power wire 101A, the load drive circuit 10, the mutual connection power wire 101C, the load drive circuit 12, the mutual connection power line 101D, the load drive circuit 14, the branch power wire 101B and again the branch point of the main power source line 2, in a loop form.

Since the main components such as the power wires are connected in a loop form in the embodiment, the total amount of power wires required in the power distribution system of the embodiment is considerably less than the amount of power wires in a power distribution system wherein each of many electrical loads is put on one outlet of a battery. Therefor, by using the power distribution system of the embodiment, it is possible to reduce the production cost of a load drive apparatus of a vehicle and to decrease the probability of occurrence of an open circuit or a short circuit.

Further, since the power distribution system of the embodiment forms a duplex power system by connecting the power wires, etc., and providing two power input terminals for each of the load drive circuits, each of the load drive circuits can receive power from another power input terminal even if it cannot receive power from a power input terminal connected to a power wire at which an open circuit or a short circuit has occurred. For example, even if an open circuit or a short circuit occurred at the branch power wire 101A, the load drive circuit 10 can still receive power from the power input terminal 10*a* on the other side, via the branch power wire 101B, and the mutual connection power wires 101D and 101C. That is, even if an open circuit or a short circuit occurred at any one of the branch power wires 101A and 101B, and the mutual connection power wires 101C and 101D, power supply to all of the load drive circuits can be secured.

Figure 8:
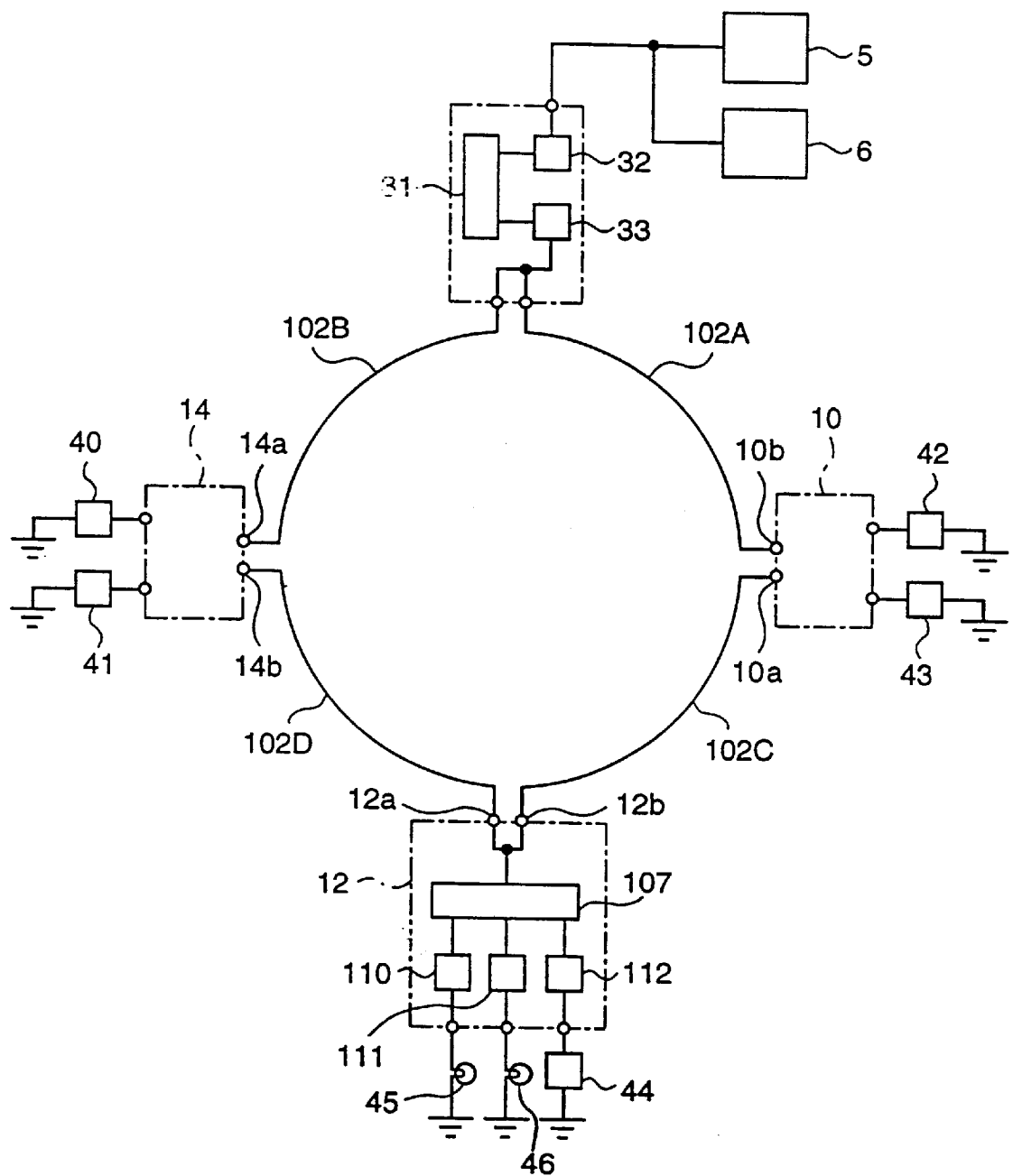
FIG. 8 is a schematic circuit illustration of a signal transmission system in the embodiment according to the invention.

In the following, transmission lines for transmitting data to each of the load drive circuits 10, 12 and 14 from the BCM 3 are explained by referring to FIG. 8.

A transmission line is branched into two paths at the BCM 3, each of the two paths commonly including a branch transmission wire 102A connected to the BCM 3 and a signal input terminal lob of the load drive circuit 10, a branch transmission wire 102B connected to the BCM 3 and a signal input terminal 14*a* of the load drive circuit 14, a mutual connection transmission wire 102C connected to a signal input terminal 10*a* of the drive circuit 10 and a signal input terminal 12*b* of the drive circuit 12, and a mutual connection transmission wire 102D connected to a signal input terminal 12*a* of the load drive circuit 12 and a signal input terminal 14*b* of the load drive circuit 14. That is, in a data transmission system of the embodiment, the main components are sequentially connected in the order of the branch point of the BCM 3, the branch transmission wire 102A, the load drive circuit 10, the mutual connection transmission wire 102C, the load drive circuit 12, the mutual connection transmission line 102D, the load drive circuit 14, the branch transmission wire 102B and again the branch point of the BCM 3, in a loop form.

Thus, the total amount of transmission wires required in the data transmission system of the embodiment can be considerably reduced. Therefore, by using the data transmission system of the embodiment, it is possible to reduce the production cost of a load drive apparatus of a vehicle and to decrease the probability of occurrence of an open circuit or a short circuit. Further, since the data transmission system of the embodiment forms a duplex data transmission system, each of the load drive circuits can receive data from another signal input terminal even if it can not receive data from a signal input terminal connected to a transmission wire at which an open circuit or a short circuit has occurred. That is, even if an open circuit or a short circuit occurred at any one of the branch transmission wires 102A and 102B, and the mutual connection transmission wires 102C and 102D, data transmission between the BCM 3 and each of all load drive circuit can still be secured.

Operations of the embodiment are explained as follows, by using flow charts. All the procedures of the processing explained in the following, are main procedures directly relating to the present invention and executed by the BCM 3.

Figure 9:
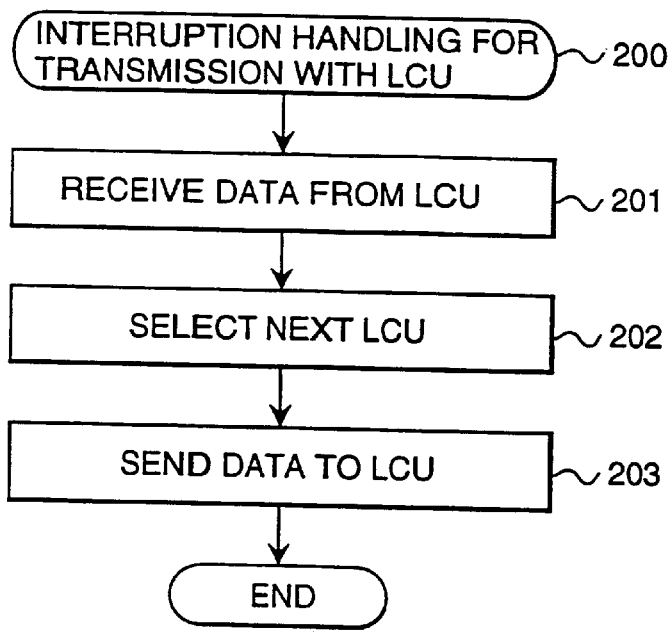
FIG. 9 is a flow chart showing interruption handling for transmission with LCUs, executed by the BCM in the embodiment according to the invention.

FIG. 9 shows a processing flow of data transmission between the BCM 3 and the LCUs 5 and 6 via the multiplex transmission wire 4. Interruption handling 200 for transmission with the LCUs processes an interruption caused by data transmission to the BCM 3 from the LCUs 5 and 6. At first, when an interruption is caused by data transmission from the LCU 5 or 6, the BCM 3 executes a procedure of receiving the data, at step 201. For example, the data may be such data as "switch on a lighting switch for head lights" as previously mentioned. At step 202, the next LCU to communicate with the BCM 3 is selected. At step 203, data transmission to the selected LCU, for example, transmission of a command data to turn on an indicator for displaying the switch-on of head lights, is processed. The LCU which has received the data from the BCM 3, sends the data to a component to perform the sent data, and also returns the received data to the BCM 3. For example, if the BCM 3 received the data of "an anomaly occurring in the power distribution system" from the load drive circuit 10, the BCM 3 sends the data to the LCU 6, and the LCU which has received the data, turns on an alarm lamp for indicating an anomaly occurrence in the power distribution system to a driver. The processing from step 201 to step 203 is cyclically repeated.

Figure 10:
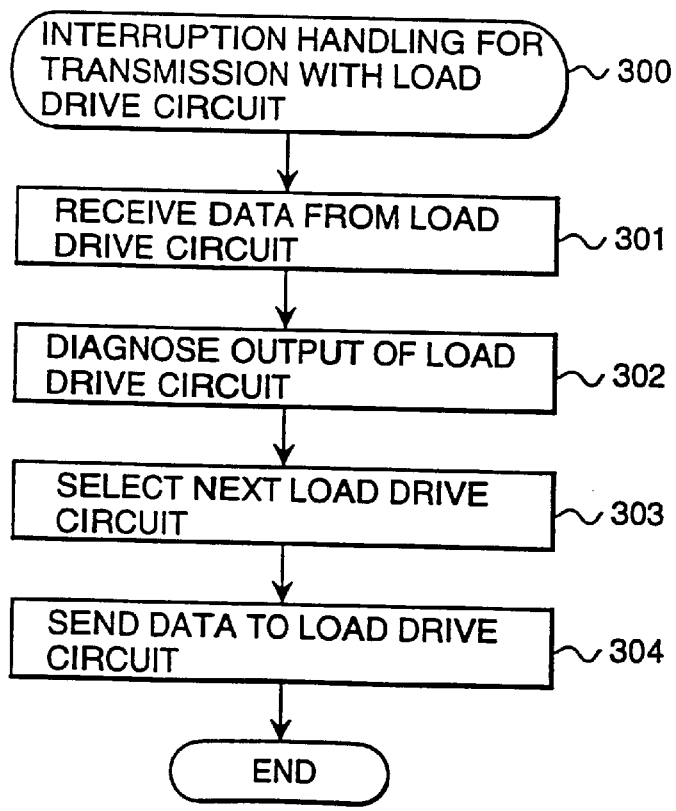
FIG. 10 is a flow chart showing interruption handling for transmission with load drive circuits, executed by the BCM in the embodiment according to the invention.

FIG. 10 shows the processing flow of data transmission between the BCM 3 and each of the load drive circuits 10, 12 and 14 via the multiplex transmission wires 102. Interruption handling 300 for transmission with the load drive circuits processes an interruption caused by data transmission to the BCM 3 from each transmission LSI 107 of the load drive circuits 10, 12 and 14. At first, when an interruption is caused by data transmission from each of the load drive circuits, the BCM 3 executes a procedure of receiving the data, at step 301. Further, the BCM 3 processes the received data containing diagnosis information on the IPDs 110, 111 and 112, diagnosis information on the electrical loads such as the loads 44, 45 and 46, the potential of each shield layer 103 of the power and multiple transmission cables 20 (20A, 20B, 20C and 20D), and the states of the switches in each of the load drive circuits 10, 12 and 14, and stores each group of the processed data at each region allocated to the group in a memory. At step 303, the next load drive circuit to communicate with the BCM 3 is selected, and at step 304, a drive command signal of an IPD and a switching command signal are sent to a transmission LSI 107 and a switching circuit of the selected load drive circuit, respectively. The processing from step 301 to step 304 is cyclically repeated.

Figure 11:
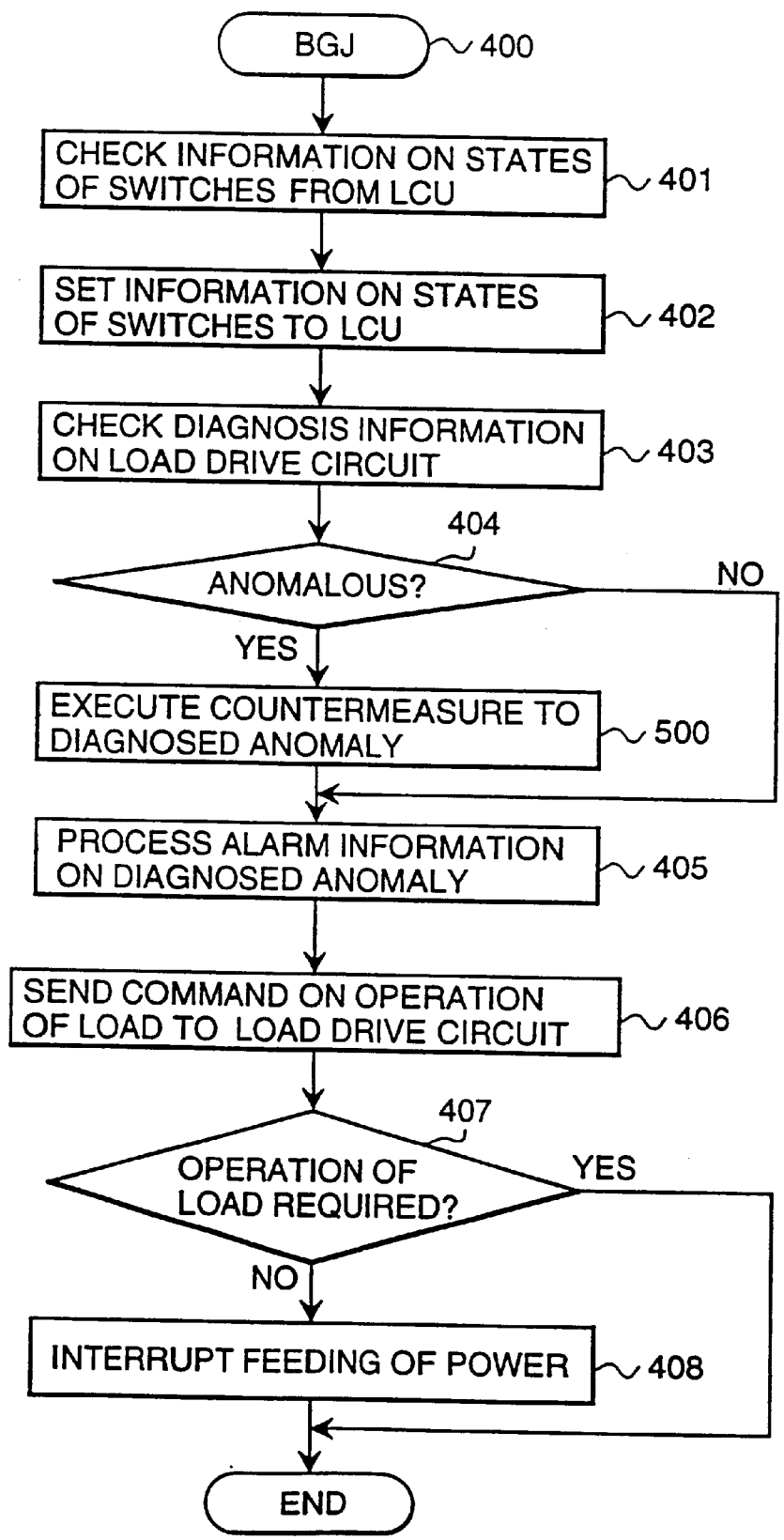
FIG. 11 is a flow chart showing back ground job processing executed by the BCM in the embodiment according to the invention.

FIG. 11 shows BGJ (Back Ground Job) processing 400 executed when the interruption handling shown in FIGS. 9 and 10 are not carried out, in which processing of control of the whole load drive apparatus of a vehicle, such as a job of determining what 25 data is to be sent to which circuit or unit, is executed based on the data sent from the LCUs and the load drive circuits.

Firstly, at step 401, the BCM 3 determines what job is to be executed, based on the data sent from the LCUs 5 and 6, and the load drive circuits 10, 12 and 14. For example, when the BCM 3 received the data "switching-on of a lighting switch for head lights" from the LCU 5, the BCM 3 determines the process of sending a control command of switching the head lights to a load drive circuit connected to the head lights, as a job to be executed. At step 402, data to be transmitted to the LCUs 5 and 6 from the BCM are set. At step 403, the BCM 3 checks the data such as diagnosis information on the IPDs 110, 111 and 112, diagnosis information on the electrical loads such as the loads 44, 45 and 46, the potential of each shield layer 103 of the power and multiple transmission cables 20 (20A, 20B, 20C and 20D), and the states of the switches in each of the load drive circuits 10, 12 and 14, of which each group data have been processed and stored at each region allocated to the group data in a memory, at step 302 shown in FIG. 10. At step 404, it is determined based on the results of the check for the stored data such as diagnosis information, whether any anomaly occurs. If an anomaly occurs, the process of step 500 for taking countermeasure to the anomaly is executed. The process of step 500 for countermeasure to the anomaly will be explained later, by referring to a flow chart shown in FIG. 12. After finishing the process of step 500, data for informing a driver that an anomaly has occurred, is prepared at step 405. The informed data is, for example, the previously mentioned data of "an anomaly occurring in the power distribution system", and when the data is sent to the LCU 6, the alarm lamp is turned on. Next, at step 406, the process of transmitting data to the load drive circuits 10,12 and 14 is executed. If it is determined that an anomaly is not occurring, the processing of steps 500 and 405 are skipped, and the process of step 406 is immediately executed. Further, if it is determined at step 407 that any data to be sent as to a load drive circuit, is not stored, that is, that an anomaly is not detected in the power distribution system, and any one of the electrical loads connected to the load drive circuits is not required to be driven, a command signal for switching off the switch C of the switching circuit 106 of the load drive circuit is set. When the transmission LSI 107 of the load drive circuit receives the command signal, the transmission LSI 107 switches off the switch C of the switching circuit 106. As a result, power supply to the IPDs included in the load drive circuit is interrupted. Thus, if the load drive elements contained in the IPDs of the load drive circuit are not to be driven, that is, the electrical loads connected to the IPDs are not to be driven, power supply to the IPDs is interrupted. As mentioned above, since power supply to IPDs is interrupted while the IPDs are not operated, power consumed in the load drive apparatus of a vehicle can be saved.

The determination of whether any one of the electrical loads connected to a load drive circuit is not required to be driven, is executed for each of the load drive circuits 10, 12 and 14, and the power supply is interrupted for the IPDs of a load drive circuit including an IPD to which an electrical load is connected, if it is determined that the electrical load is not required to be driven, at step 408.

Figure 12:
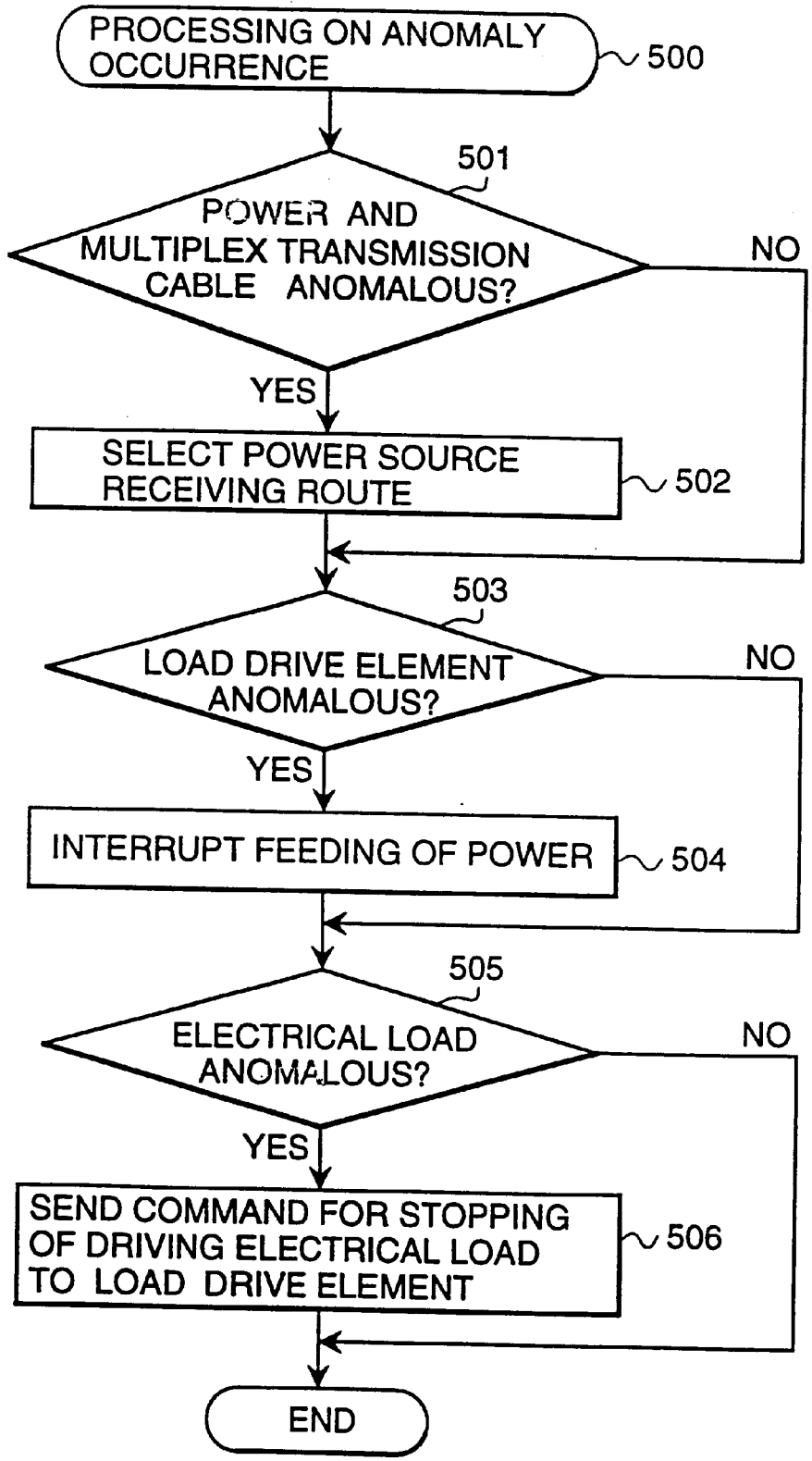
FIG. 12 is a flow chart showing control processing on anomaly occurrence, executed by the BCM in the embodiment according to the invention.

FIG. 12 is a detailed flow chart of the process of step 500 shown in FIG. 11. At step 501, it is determined whether an open circuit or a short circuit occurs at the power and multiplex transmission cables 20 (20A–20D), based on the taken-in potential of the shield layer 103 of each power and multiplex transmission cable. If an open circuit or a short circuit occurs at a power wire 101 of a power and multiplex transmission cable, an anomalous potential change is always detected at the shield layer 103 covering the power wire 101.

The potential of the shield layer of each power and multiplex transmission cable is monitored by each transmission LSI 107 in the load drive circuits 10, 12 and 14, and if any anomalous potential at each shield layer is detected, data of the detected anomalous potential are immediately sent to the micro-computer 31 in the BCM 3. The BCM 3 analyzes the sent anomalous potential data, and determines which of an open circuit or a short occurs at the problem one of the power and multiplex transmission cables 20.

If an anomaly occurs at the power and multiplex transmission cables 20, the process goes to step 502, otherwise, step 502 is skipped and the process goes to step 503.

At step 502, command data for switching off the switching circuit 34 of the BCM 3 or switch A or B in the corresponding two of the load drive circuits 10, 12 and 14, are set. When the command data is sent and received by the micro-computer 31 of the BCM 3, and/or the transmission LSIs of the corresponding two of the load drive circuits 10, 12 and 14, the switching circuit 34 and/or the switching circuits 106 of the corresponding two of the load drive circuits, are operated, and power supply from the cable at which the open circuit or the short circuit occurs, of the power and multiplex transmission cables 20 (20A–20B), is interrupted, and power supply is continued from only the remaining normal power and multiplex cables. That is, the cable at which the open circuit or the short circuit occurs, is electrically separated from the power distribution system of the load drive apparatus of a vehicle. The method of determining at which one of the power and multiplex transmission cables 20 (20A–20D) an open circuit or a short circuit occurs, and the method of operating the switching circuits 34 of the BCM 3 and/or 106, of corresponding ones of the load drive circuits 10, 12 and 14, will be explained later.

As explained with reference to FIGS. 7 and 8, even if an open circuit or a short circuit occurs at one of the power and multiplex transmission cables 20, the load drive apparatus of the embodiment can continue to feed power and transmit data, to each of the load drive circuits 10, 12 and 14. However, if a short circuit occurs at one of the power wires 101, there is a fear that the battery 1 may be quickly exhausted, due to large power consumption of the battery 1 and a fear that a fire may occur at the place of the short circuit. Therefore, in the embodiment, since the problem one of the power and multiplex transmission cables 20, at which a short circuit occurs, is electrically separated from the power distribution system, that current leaks from the place of the short circuit to a chassis of a vehicle body can be avoided. Although it is available to provide similar switching circuits of the transmission wires at the BCM 3 and each of the load drive circuits so that an anomalous transmission wire is separated from the data transmission system of the load drive apparatus on an anomaly occurrence of one of the transmission wires, such switching circuits are not provided in the embodiment for the reason that the battery exhaustion or fire, caused by a short circuit at a transmission wire, rarely occurs since the level of electrical energy applied to the transmission wires is much less than the electrical energy level of the power wires.

Returning to the flow chart shown in FIG. 12, at step 503, it is checked whether an anomaly occurs at any one of the load drive elements of the IPDs. An anomaly occurrence at a load drive element, as mentioned previously, is identified by the transmission LSI 107 in each of the load drive circuits 10, 12 and 14, based on the load drive signal, the load diagnosis signal and the load drive element diagnosis signal. The micro-computer 31 in the BCM 3 monitors an anomaly occurrence at the load drive elements, based on the load drive element diagnosis information sent from the transmission LSI 107 in each of the load drive circuits 10, 12 and 14. Further, at step 504, the BCM 3 sets command data for switching off a switch C of a switching circuit in the one of the load drive circuits 10, 12 and 14 which includes the anomalous load drive element. When the command data is sent to a transmission LSI 107 in the one of the load drive circuits 10, 12 and 14 including an anomalous load drive element, the transmission LSI 107 switches off the switch C of the switching circuit 106. Thus, power supply to each load drive element of the load drive circuit, is interrupted.

At step 505, it is checked whether an anomaly occurs at any one of the electrical loads. An anomaly occurrence of an electrical load, as mentioned previously, is identified by the transmission LSI 107 in each of the load drive circuits 10, 12 and 14, based on the load drive signal, the load diagnosis signal and the load drive element diagnosis signal. The micro-computer 31 in the BCM 3 monitors an anomaly occurrence at the electrical loads, based on the electrical load diagnosis information sent from the transmission LSI 107 in each of the load drive circuits 10, 12 and 14. Further, at step 506, the BCM 3 sets command data for stopping output of a load drive signal to the IPD connoted to an anomalous electrical load. When the command data is sent to a transmission LSI 107 in the one of the load drive circuits 10, 12 and 14 connected to the anomalous electrical load, the transmission LSI 107 stops outputting a load drive signal to the IPD connected to the anomalous electrical load.

If one of the process steps 502, 504 and 506 is executed, the processing of transmitting alarm information on a diagnosed anomaly is executed at step 405 shown in FIG. 11.

Figure 13:
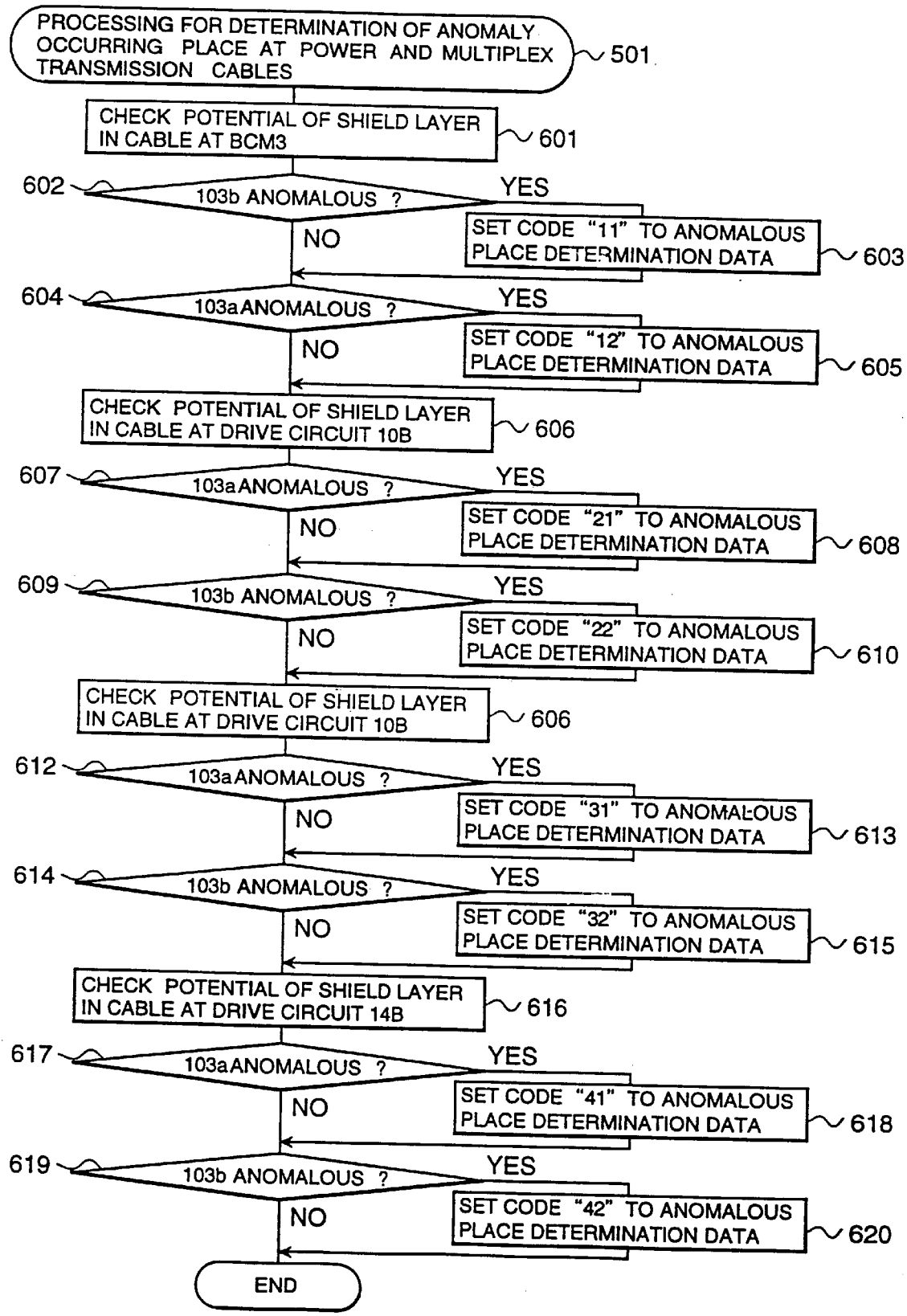
FIG. 13 is a flow chart showing processing for determination of an anomaly occurring place in power source and multiplex transmission cables, executed by the BCM in the embodiment according to the invention.

FIG. 13 is a detailed flow chart of the process of step 501 shown in FIG. 12.

Firstly, at step 601, the BCM 3 checks the potential data of two shield layers 103 of the power and multiplex transmission cables, obtained by itself. That is, the BCM 3 checks the shield layers 103a and 103b of the power and multiplex cables 20A and 20B connected to the BCM 3. At step 602, it is determined whether the potential of the shield layer 103b is anomalous ("anomalous" means that the detected potential is lower than the potential applied to the shield layer at a constant level). If the potential of the shield layer 103b is anomalous, a code "11" is set to anomalous place (cable) determination data, at step 603. Successively, at step 604, it is determined whether the potential of the shield layer 103a of the two shield layers 103a and 103b is anomalous. If the potential of the shield layer 103a is anomalous, a code "12" is set to the anomalous place determination data, at step 605.

Next, at step 606, the BCM 3 checks the potential data of two shield layers 103 of the power and multiplex transmission cables 20, sent from the load drive circuit 10. That is, the BCM 3 checks the shield layers 103a and 103b of the power and multiplex cables 20A and 20C connected to the load drive circuit 10. At step 607, it is determined whether the potential of the shield layer 103a is anomalous, and if the potential of the shield layer 103a is anomalous, a code "21" is set to the anomalous place determination data, at step 608. Successively, at step 609, it is determined whether the potential of the shield layer 103b is anomalous. If the potential of the shield layer 103b is anomalous, a code "22" is set to the abnormal place determination data, at step 605.

Similarly, as for the load drive circuits 12 and 14, the BCM 3 checks the potential data of two shield layers 103 of the power and multiplex transmission cables 20 connected to each of the load drive circuit 12 and 14. If the potential of the shield layer 103a of the two shield layers 103a and 103b of the two power and multiplex transmission cables 101C and 102D connected to the load drive circuit 12, is anomalous, a code "31" is set to the anomalous place determination data, at step 613. If the potential of the shield layer 103b is anomalous, a code "32" is set to the anomalous place determination data, at step 615. Further, if the potential of the shield layer 103a of the two shield layers 103a and 103b of the two power and multiplex transmission cables 20D and 20B connected to the load drive circuit 14, is anomalous, a code "41" is set to the anomalous Place determination data, at step 618. If the potential of the shield layer 103*b* is anomalous, a code "42" is set to the anomalous place determination data, at step 620.

By using the rules, shown by the table in FIG. 14, for determining an anomalous place and switching the switches of the switching circuits, the anomalous place determination data to which the above-mentioned codes are set, are analyzed at step 502 shown in FIG. 12 and the anomalous place is determined, and data for switching off the switch A or B of the switching circuits in the BCM 3 and/or the load drive circuits, corresponding to the determined anomalous place (cable).

Figure 15:
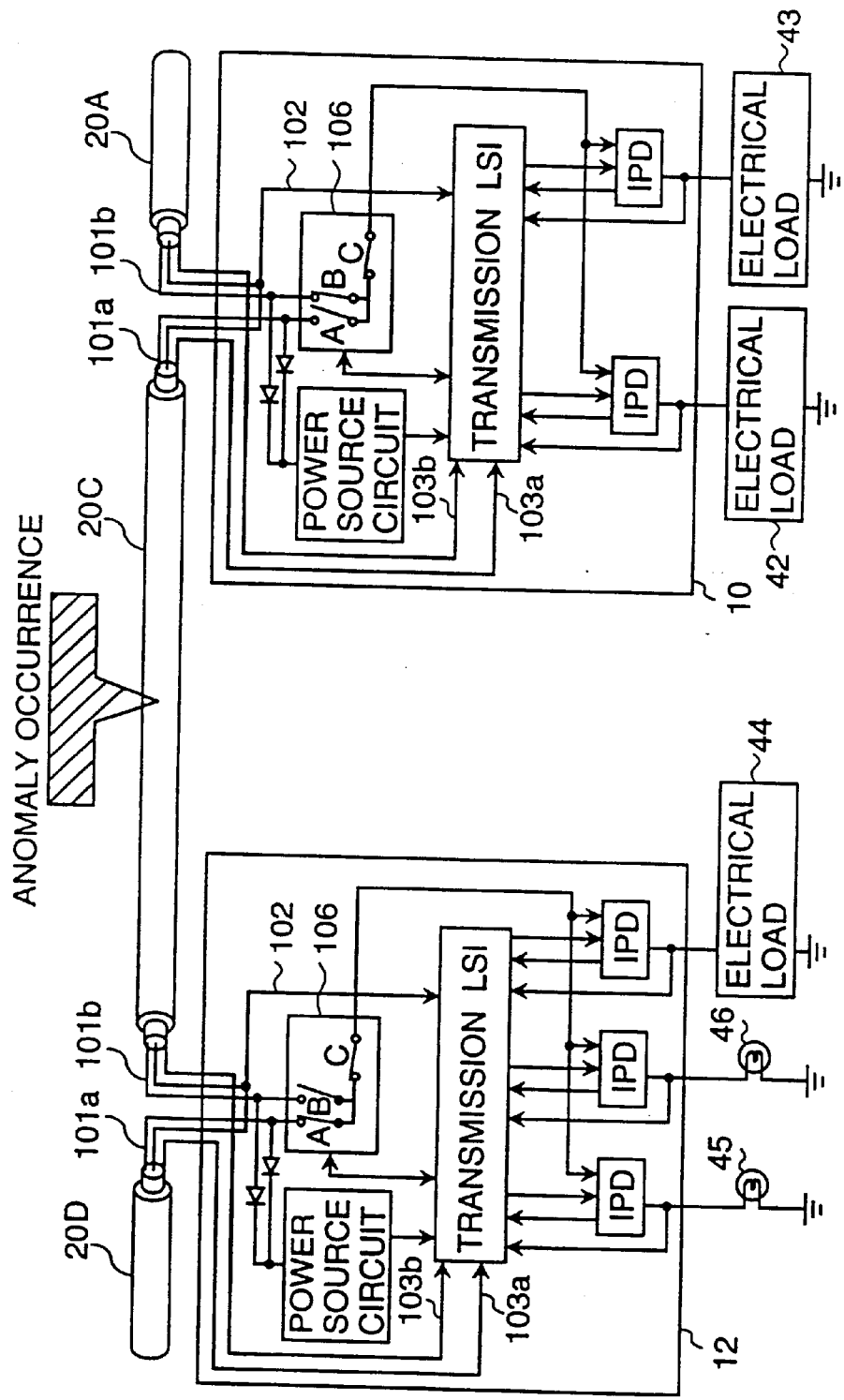
FIG. 15 is a diagram for explaining switching states of two load drive circuits, between which a short circuit occurs, in the embodiment of an apparatus for driving electrical loads of a vehicle.

For example, as shown in FIG. 15, when a short circuit occurs at the power and multiplex transmission cable 20C connecting the two load drive circuits 10 and 12, the codes "21" and "32" are set to the anomalous place determination data, at step 608 and step 615 shown in FIG. 13, respectively. Successively, at step 502 shown in FIG. 12, it is determined by referring to the table shown in FIG. 14 that an open circuit or a short circuit has occurred at the power and transmission cable 20C connecting the load drive circuits 10 and 12, since the codes "21" and "32" have been set to the abnormal place determination data. Therefore, switching signals for switching OFF and ON the switches A and B of the switching circuit 106 in the load drive circuit 10, respectively, are set, and further switching signals for switching ON and OFF the switches A and B of the switching circuit 106 in the load drive circuit 12, respectively, are set. Thus, the switches A and B of the switching circuit 106 in the load drive circuit 10, are switched OFF and ON, respectively, and further the switches A and B of the switching circuit 106 in the load drive circuit 12, are switched ON and OFF, respectively. Consequently, the power and multiplex transmission cable 20C is electrically separated from the power distribution system of the load drive apparatus.

Figure 16:
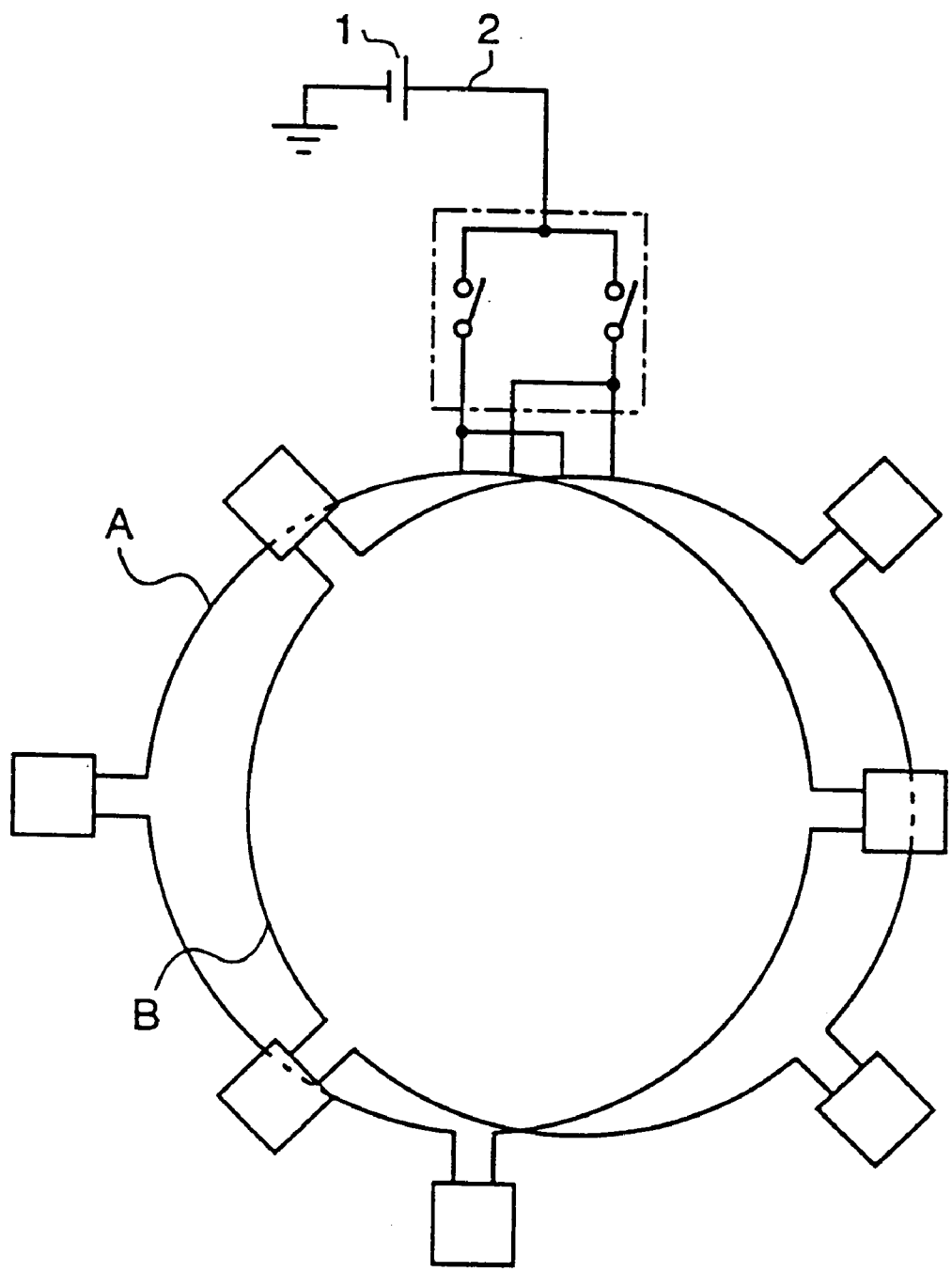
FIG. 16 is a circuit diagram of the power distribution system in another embodiment of an apparatus for driving electrical loads of a vehicle according to the invention.
Figure 17:
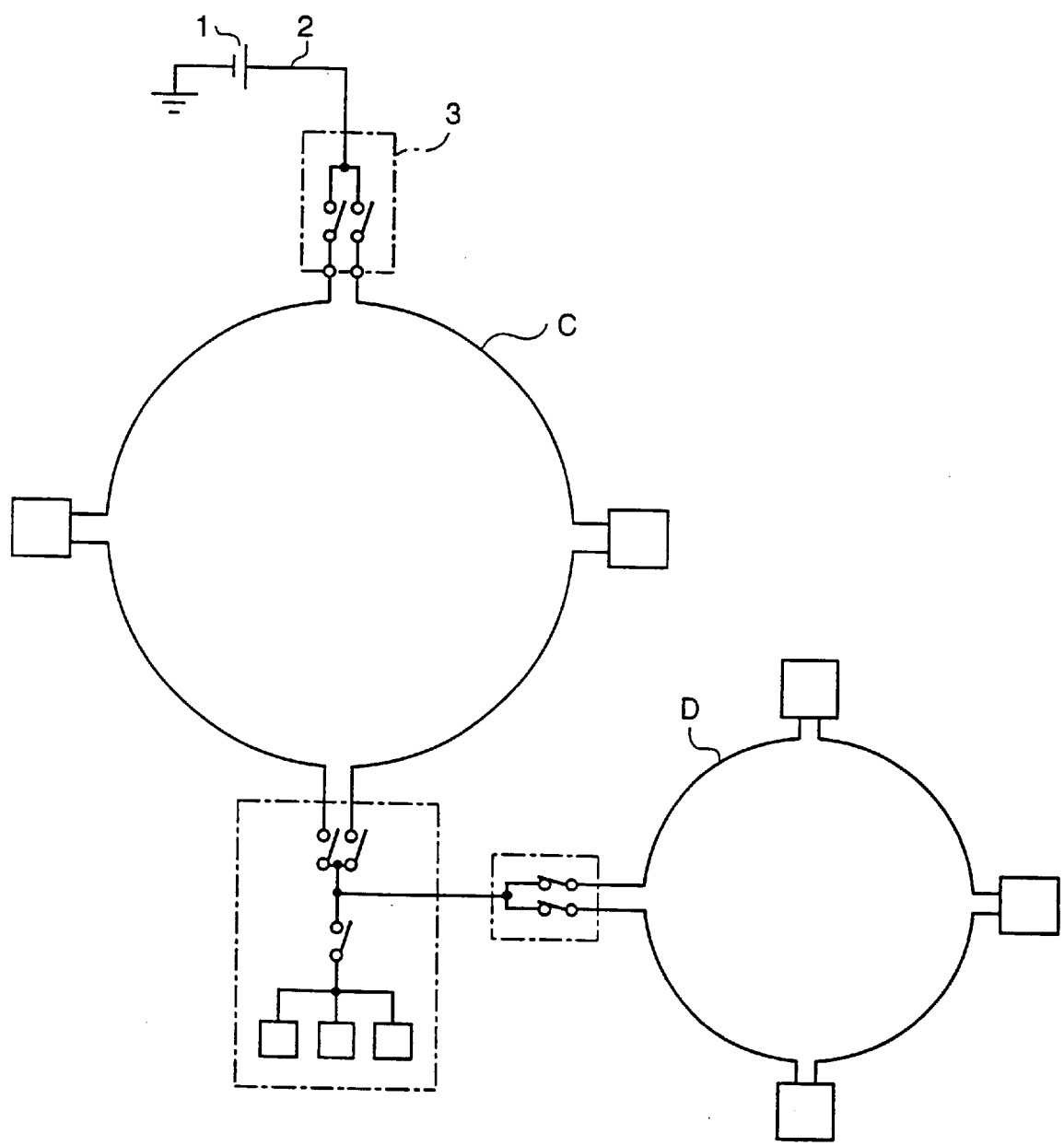
FIG. 17 is a circuit diagram of the power distribution system in another embodiment of an apparatus for driving electrical loads of a vehicle according to the invention.

Further, although only one loop power source line is provided in the above-explained embodiment, it is available, if a number of electrical loads are provided at a vehicle, that two loop power source lines A and B are connected to the BCM 3 in parallel, as shown in FIG. 16. Furthermore, if many electrical loads are concentratedly arranged at a specific place of a vehicle, it is effective to connect two loop lines, each of the two loop lines being composed of power wires and load drive circuits to the BCM 3 in series, as shown in FIG. 17.

In the present invention, since the branch power wires, the load drive circuits and the mutual connection power wires are connected in an electrical loop, the total amount of power wires used for a load driving apparatus of a vehicle is much less in comparison with the amount of power wires used for an existing drive apparatus in which all power lines connected to electrical equipment are put to one outlet of a power source, which reduces the production cost of the load driving apparatus and the probability of an open circuit or a short circuit occurring at the power wires.

Further, in the present invention, since two power input terminals are provided at each of the load drive circuits, and the two power input terminals receive power from the power source, respectively, that is, a duplex power distribution system is realized, then even if an open circuit or a short circuit occurs at one of two power wires of the two power input terminals of a load drive circuit, it is possible to continue supplying power to each of the load drive circuits via a power input terminal connected to a remaining normal power wire, which improves the reliability of the load driving apparatus of a vehicle.

What is claimed is:

1. A control apparatus for driving electrical loads provided at a vehicle, said apparatus comprising:

at least two power wires arranged in said vehicle;

load drive elements connected to said at least two power wires, each of said load drive elements feeding power to one of said electrical loads from one of said power wires; and a cut-off circuit for monitoring said load drive elements and electrically cutting off a switching element connected between said at least two power wires and one of said load drive elements if said one of said load drive elements is determined to be anomalous, by said cut-off circuit.

2. A control apparatus for driving electrical loads provided at a vehicle, said apparatus comprising:

at least two power wires arranged in said vehicle;

load drive elements connected to said at least two power wires, each of said load drive elements feeding power to one of said electrical loads from one of said at least two power wires;

an anomaly detection circuit for detecting at least one of a short circuit and an open circuit in said at least two power wires; and a switching circuit for switching a connection of one of said electrical loads, connected to one of said at least two power wires, which has been detected to be anomalous by said anomaly detection circuit, to another connection to a normal one of said at least two power wires.

* * * * *